(12) United States Patent
Aitchison et al.

(10) Patent No.: US 10,758,433 B2
(45) Date of Patent: Sep. 1, 2020

(54) WHEELCHAIR VEHICLE ENTRY SYSTEM

(71) Applicant: DIGNIFIED LIVING LLC, Phoenix, AZ (US)

(72) Inventors: David Jeffrey Aitchison, Phoenix, AZ (US); Michael Dale Aitchison, Oldsmar, FL (US); Kris Lee Minyard, Mesa, AZ (US)

(73) Assignee: DIGNIFIED LIVING LLC, Chandler, AZ (US)

( * ) Notice: Subject to any disclaimer, the term of this patent is extended or adjusted under 35 U.S.C. 154(b) by 0 days.

(21) Appl. No.: 15/861,996

(22) Filed: Jan. 4, 2018

(65) Prior Publication Data
US 2018/0193210 A1    Jul. 12, 2018

Related U.S. Application Data

(60) Provisional application No. 62/443,054, filed on Jan. 6, 2017.

(51) Int. Cl.
*A61G 3/06*     (2006.01)
*B62D 65/02*    (2006.01)
(Continued)

(52) U.S. Cl.
CPC .............. *A61G 3/066* (2013.01); *A61G 3/062* (2013.01); *A61G 3/0808* (2013.01); *B60N 2/14* (2013.01);
(Continued)

(58) Field of Classification Search
CPC ........ A61G 7/1042; A61G 3/02; A61G 3/062; Y10S 414/134; B60P 1/4428; B60N 2/245
See application file for complete search history.

(56) References Cited

U.S. PATENT DOCUMENTS

| | | | | |
|---|---|---|---|---|
| 4,096,955 A | * | 6/1978 | Dake | B60P 1/4442 |
| | | | | 414/541 |
| 4,155,587 A | * | 5/1979 | Mitchell | B60N 2/245 |
| | | | | 296/65.12 |

(Continued)

FOREIGN PATENT DOCUMENTS

JP    2005-319280 A    11/2005

OTHER PUBLICATIONS

International Search Report & Written Opinion of the International Searching Authority issued in corresponding International Application No. PCT/US2018/012348 dated Apr. 4, 2018.
(Continued)

*Primary Examiner* — Mark C Hageman
(74) *Attorney, Agent, or Firm* — Pillsbury Winthrop Shaw Pittman, LLP

(57) ABSTRACT

A system for lifting a wheelchair into and out of a vehicle is provided. The system includes a driver side and a passenger side wheelchair supports, a driver side and a passenger side extendable lift assemblies, and a control system. The driver side extendable lift assembly is arranged to move the driver side wheelchair support between a stowed position within the vehicle and a deployed position extended horizontally outside the vehicle and lowered towards the ground. The passenger side extendable lift assembly is arranged to move the passenger side wheelchair support between its stowed position and its deployed position. The control system is configured to independently operate the driver side extendable lift assembly and the passenger side extendable lift assembly to separately or simultaneously move the driver side wheelchair support and the passenger side wheelchair support between their respective stowed positions and their respective deployed positions.

18 Claims, 24 Drawing Sheets

(51) Int. Cl.
*B60N 2/24* (2006.01)
*B60N 2/14* (2006.01)
*A61G 3/08* (2006.01)

(52) U.S. Cl.
CPC ............ *B60N 2/245* (2013.01); *B62D 65/02* (2013.01); *A61G 2203/10* (2013.01)

(56) References Cited

U.S. PATENT DOCUMENTS

| | | | | |
|---|---|---|---|---|
| 4,483,653 | A * | 11/1984 | Waite | B60N 2/245 |
| | | | | 280/250.1 |
| 5,026,244 | A | 6/1991 | Dorn | |
| 5,308,214 | A | 5/1994 | Crain et al. | |
| 5,542,811 | A | 8/1996 | Vartanian | |
| 6,024,398 | A * | 2/2000 | Horton | B60N 2/062 |
| | | | | 296/65.07 |
| 6,223,364 | B1 * | 5/2001 | Egan | B60N 2/245 |
| | | | | 5/81.1 R |
| 7,284,944 | B1 * | 10/2007 | Schlangen | B60P 1/4421 |
| | | | | 414/541 |
| 7,293,952 | B2 * | 11/2007 | Park | A61G 3/06 |
| | | | | 414/542 |
| 7,845,703 | B2 * | 12/2010 | Panzarella | B60N 2/0232 |
| | | | | 296/65.11 |
| 7,862,287 | B2 * | 1/2011 | Egan | B60N 2/245 |
| | | | | 414/541 |
| 8,398,356 | B2 | 3/2013 | Sandoz | |
| 8,998,558 | B2 * | 4/2015 | Kitchin | A61G 3/06 |
| | | | | 280/6.152 |
| 10,470,951 | B2 * | 11/2019 | Kitchin | A61G 3/062 |
| 2010/0054900 | A1 | 3/2010 | Houtveen et al. | |
| 2011/0002764 | A1 | 1/2011 | Darnell et al. | |
| 2011/0070057 | A1 | 3/2011 | Kitchin et al. | |
| 2012/0294699 | A1 | 11/2012 | Sandoz | |
| 2016/0074261 | A1 * | 3/2016 | Schoenian | A61G 3/062 |
| | | | | 414/462 |

OTHER PUBLICATIONS

International Search Report dated Apr. 4, 2018 issued in corresponding International Patent Application No. PCT/US2018/012348.
International Preliminary Report on Patentability and Written Opinion of the International Searching Authority dated Jul. 9, 2019 issued in corresponding International Patent Application No. PCT/US2018/012348.

* cited by examiner

WHEELCHAIR VEHICLE ENTRY SYSTEM

CROSS-REFERENCE TO RELATED APPLICATIONS

This Application claims priority to U.S. Provisional Patent Application Ser. No. 62/443,054, filed Jan. 6, 2018, the subject matter of which is incorporated herein by reference in entirety.

BACKGROUND

Field

The present patent application relates to a system for lifting a wheelchair into and out of a vehicle.

Description of Related Art

Vehicle wheelchair lifts are known devices for lifting and lowering a wheelchair and an occupant seated thereon to enter and exit a vehicle. The wheelchair lift generally includes a platform for the wheelchair and a mechanism for raising and lowering the platform between the ground level (outside the vehicle) and the vehicle. There are two common entry configurations for these wheelchair lifts: side-entry configuration and rear-entry configuration.

The present patent application provides various improvements over known wheelchair lift systems.

BRIEF SUMMARY

In one embodiment of the present patent application, a system for lifting a wheelchair into and out of a vehicle is provided. The vehicle has a vehicle body, a passenger side front seat region, a driver side front seat region, a movably connected passenger side door closing the passenger side front seat region, and a movably connected driver side door closing the driver side front seat region. The system includes a driver side wheelchair support, a driver side extendable lift assembly, a passenger side wheelchair support, a passenger side extendable lift assembly, and a control system. The driver side wheelchair support is disposed in the driver side front seat region of the vehicle. The driver side extendable lift assembly is arranged to move the driver side wheelchair support between a stowed position within the vehicle and a deployed position extended horizontally outside the vehicle and lowered towards the ground. The passenger side wheelchair support is disposed in the passenger side front seat region of the vehicle. The passenger side extendable lift assembly is arranged to move the passenger side wheelchair support between a stowed position within the vehicle and a deployed position extended horizontally outside the vehicle and lowered towards the ground. The control system comprises a power source and a controller. The control system is configured to independently operate the driver side extendable lift assembly and the passenger side extendable lift assembly to separately or simultaneously move the driver side wheelchair support and the passenger side wheelchair support between their respective stowed positions and their respective deployed positions.

In another embodiment of the present patent application, a method for installing a system for lifting a wheelchair into and out of a vehicle is provided. The system comprises a wheelchair support and an extendable lift assembly configured to move the wheelchair support between its stowed position within the vehicle and its deployed position extended horizontally outside the vehicle and lowered towards the ground. The method includes modifying vehicle floor pan and/or vehicle floor frame of the vehicle to form a modified vehicle floor pan and accommodate the extendable lift assembly and the wheelchair support; mounting a roof support member having a guide member disposed thereon to a roof of the vehicle; mounting a lift base member having guide members disposed thereon to the modified vehicle floor pan; and installing the wheelchair support such that a guide engagement member disposed on the wheelchair support is slidably engaged with one of the guide members disposed on the lift base member and a guide engagement member disposed on the extendable lift assembly is slidably engaged with the guide member disposed on the roof support member.

In another embodiment of the present patent application, a system for lifting a wheelchair into and out of a vehicle. The vehicle has a vehicle structure, a seat region, a movably connected door closing the seat region, and a vehicle longitudinal axis. The system comprises an extendable lift assembly configured to be connected to the vehicle structure; and a wheelchair support disposed in the seat region, configured to be operatively connected to the extendable lift assembly and movable between a stowed position within the vehicle and a deployed position extended horizontally outside the vehicle and lowered towards the ground. The extendable lift assembly is configured to: horizontally translate the wheelchair support, along a first axis perpendicular to the vehicle longitudinal axis, between the stowed position and a generally horizontally extended position; rotationally move the wheelchair support, about a second axis perpendicular to the vehicle longitudinal axis, between the generally horizontally extended position and a rotationally extended position; and vertically translate the wheelchair support, along the second axis perpendicular to the vehicle longitudinal axis, between the rotationally extended position and the deployed position.

In yet another embodiment of the present patent application, a module for lifting a wheelchair into and out of a vehicle is provided. The vehicle has a vehicle structure, a seat region, a movably connected door closing the seat region, and a vehicle longitudinal axis. The module comprises an extendable lift assembly configured to be connected to the vehicle structure; a roof support member configured to be connected to a roof of the vehicle, the roof support member having a guide member disposed thereon; a lift base member configured to be connected to a floor of the vehicle, the lift base member having a guide member disposed thereon; and a wheelchair support disposed in the seat region of the vehicle, the wheelchair support configured to be operatively connected to the extendable lift assembly and movable between a stowed position within the vehicle and a deployed position horizontally extended outside the vehicle and lowered towards the ground. The extendable lift assembly includes a guide engagement member configured to be slidably engaged with the guide member of the roof support member to guide the wheelchair support during a horizontal movement of the wheelchair support along a first axis perpendicular to a vehicle longitudinal axis.

Other objects, features, and advantages of one or more embodiments of the present patent application will seem apparent from the following detailed description, and accompanying drawings, and the appended claims.

BRIEF DESCRIPTION OF THE DRAWINGS

Various embodiments will now be disclosed, by way of example only, with reference to the accompanying schematic drawings in which corresponding reference symbols indicate corresponding parts, in which.

DETAILED DESCRIPTION

Figure 1:
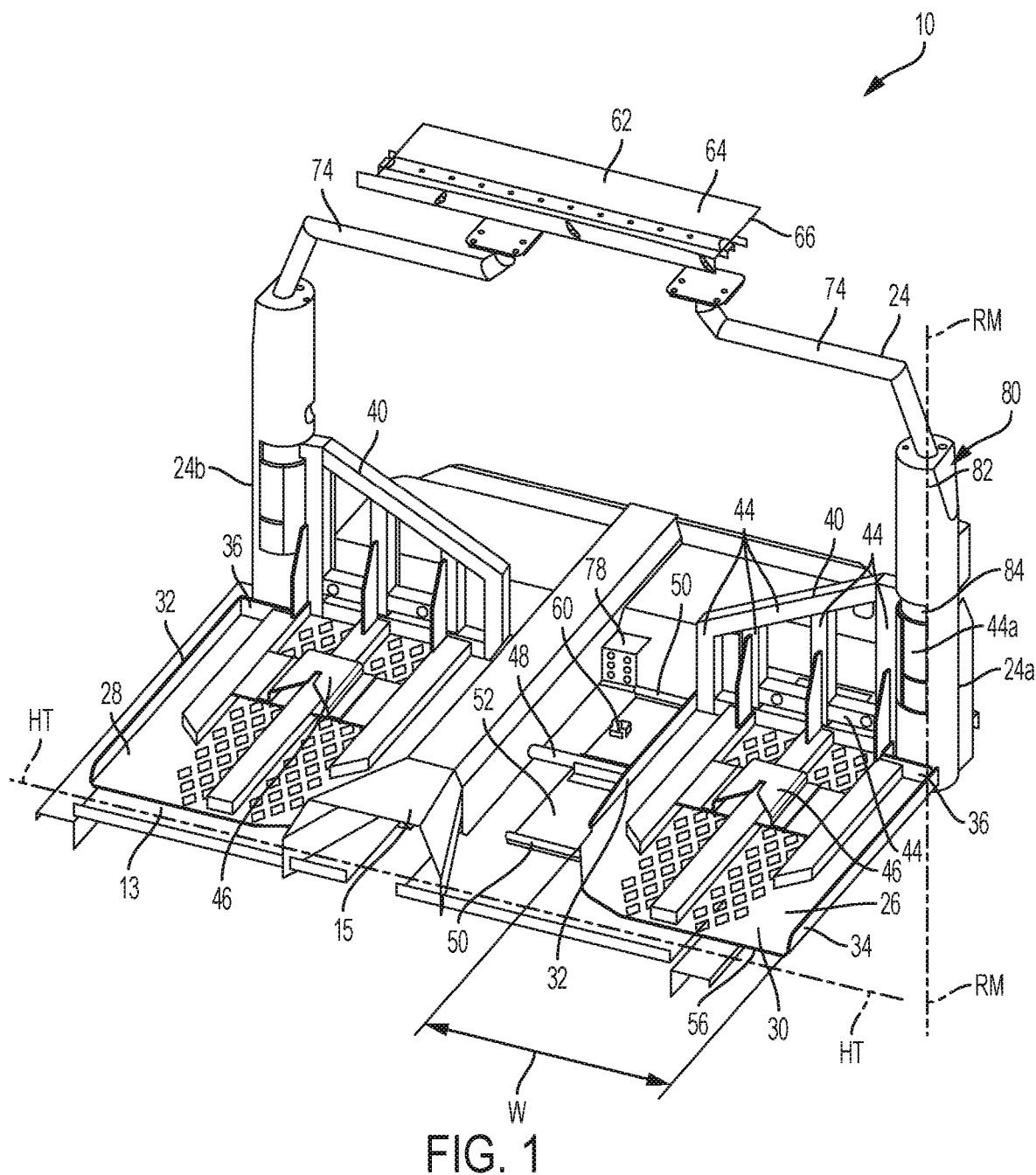
FIG. 1 is a front perspective view of a system for lifting a wheelchair into and out of a vehicle in accordance with an embodiment of the present patent application, wherein a driver side wheelchair support is shown in its generally horizontally extended position, while a passenger side wheelchair support is shown in its stowed position.
Figure 2:
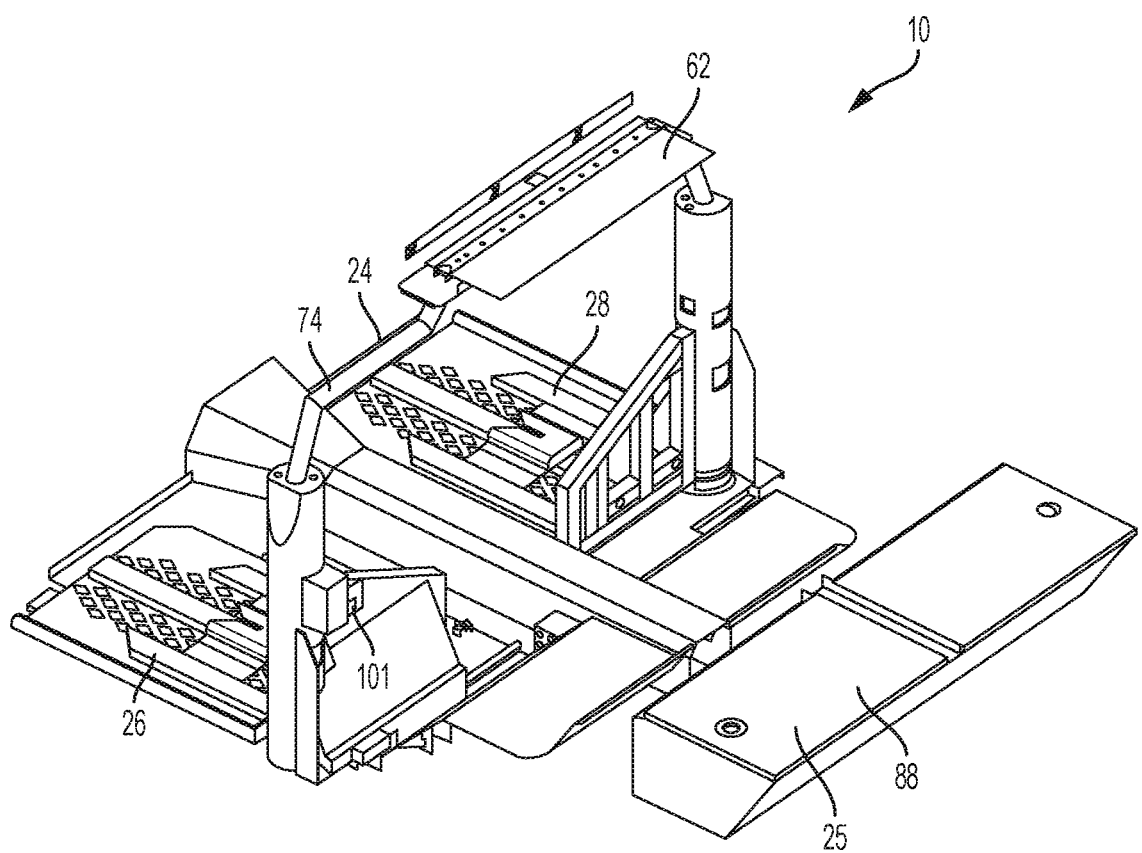
FIG. 2 is a rear perspective view of the system for lifting the wheelchair into and out of the vehicle in accordance with an embodiment of the present patent application.
Figure 3:
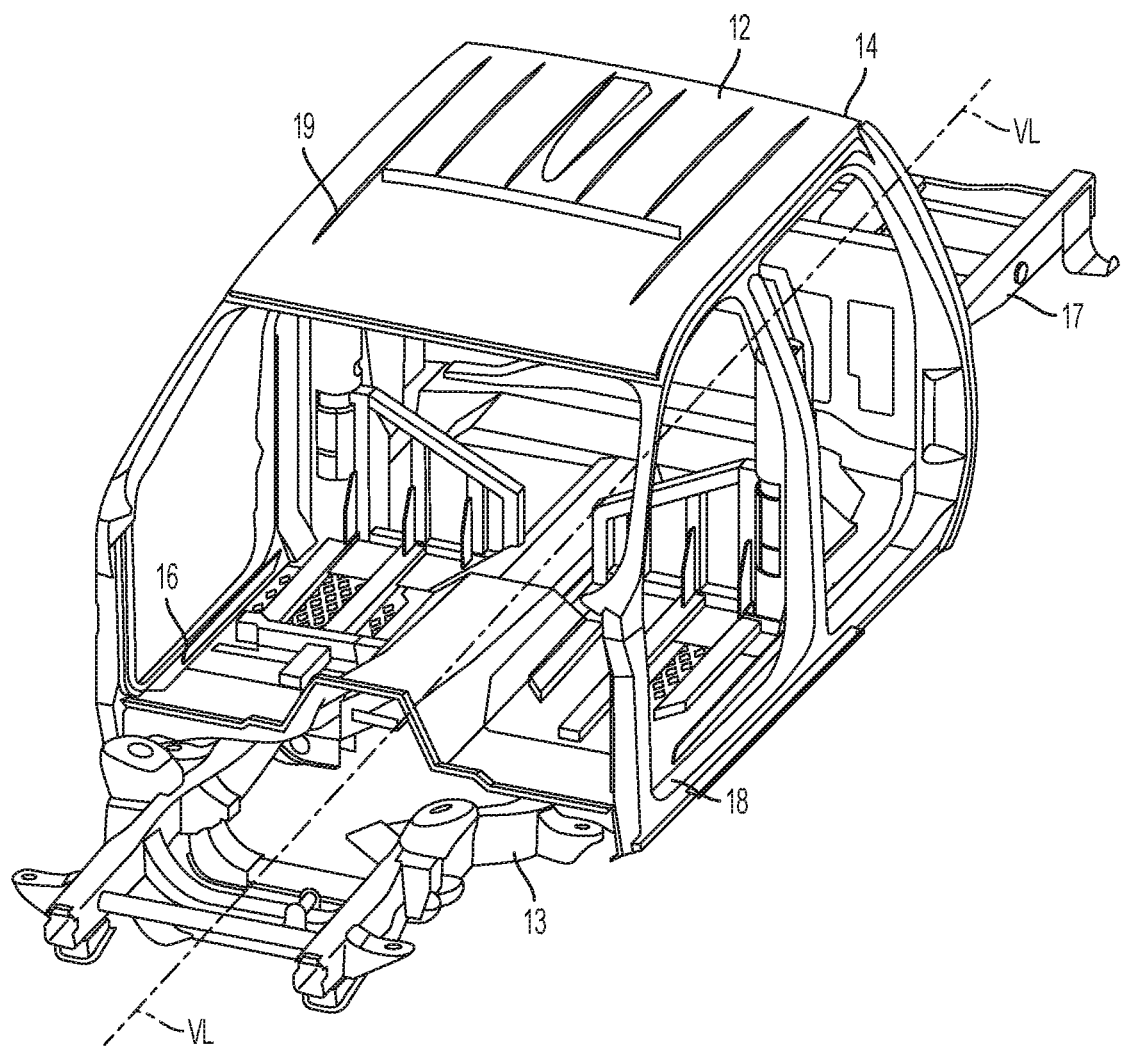
FIG. 3 is a perspective view of a vehicle body with the system for lifting the wheelchair installed therein in accordance with an embodiment of the present patent application.
Figure 19:
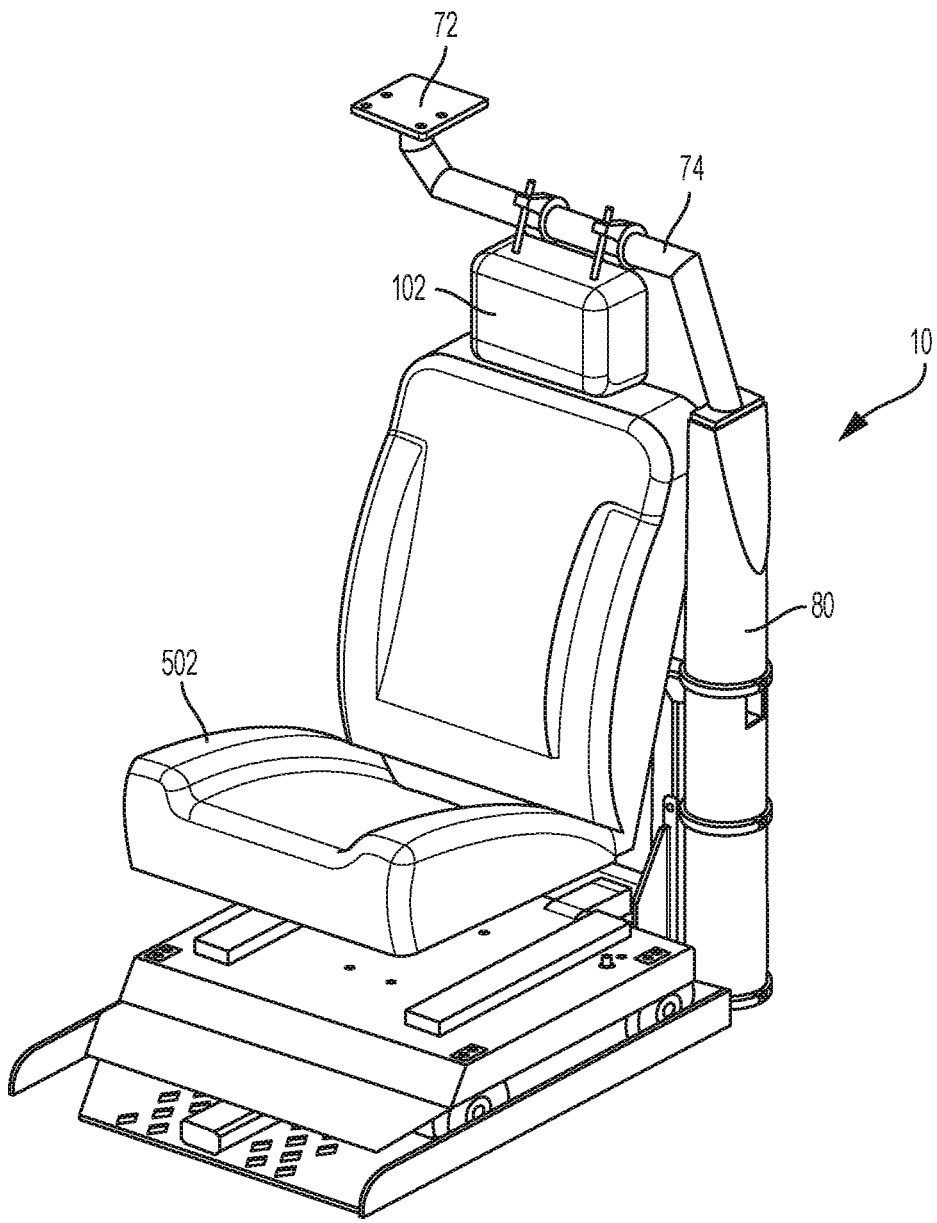
FIGS. 19 and 20 show perspective views of an exemplary system with a removable, integrated headrest in accordance with an embodiment of the present patent application.
Figure 20:
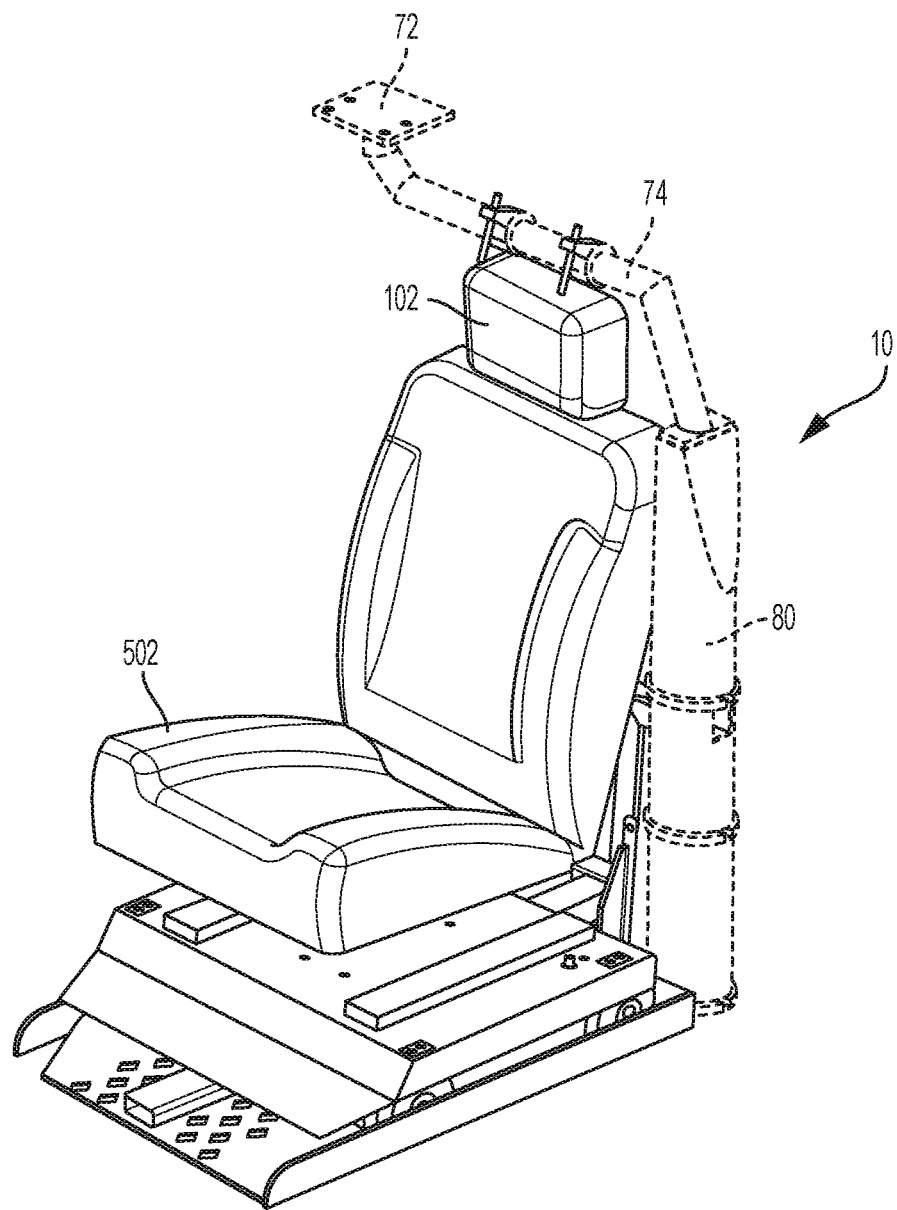
Figure 21:
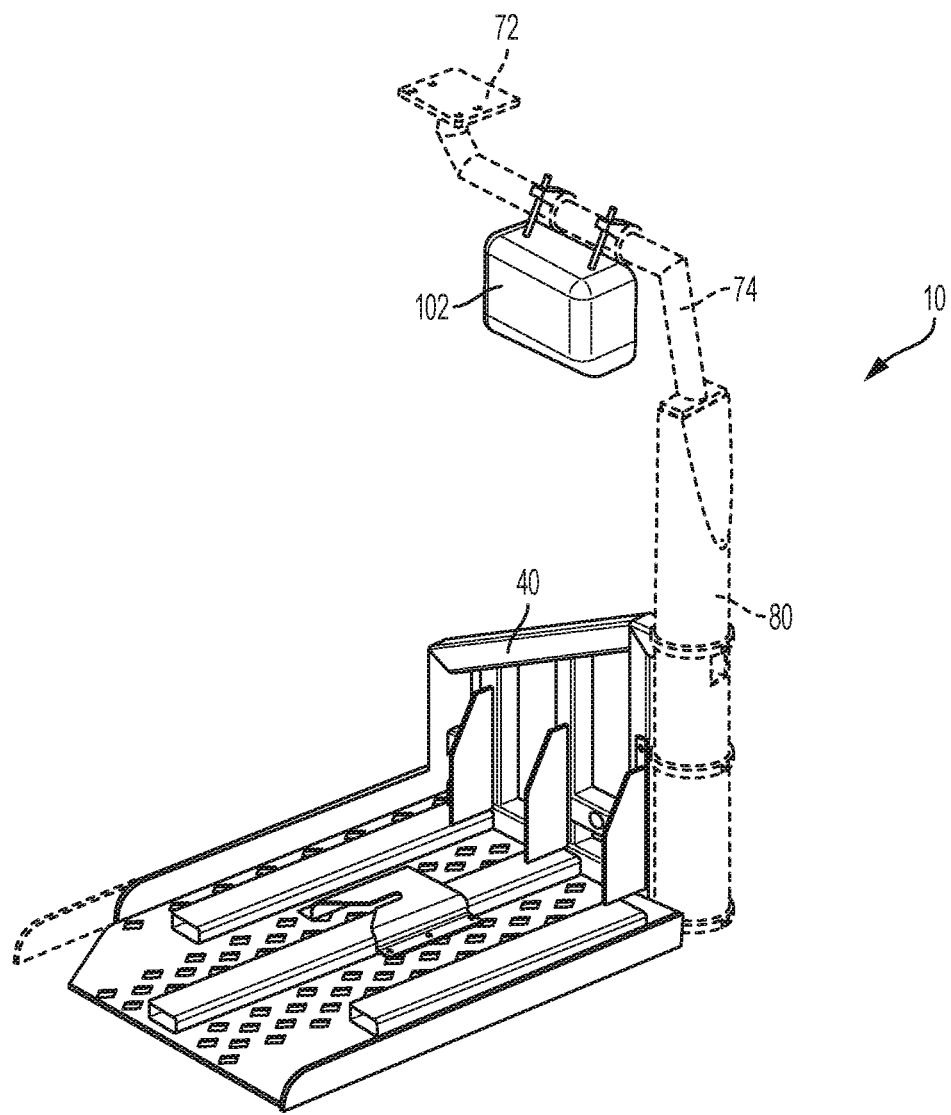
FIG. 21 shows another perspective view of the exemplary system with the integrated headrest in accordance with an embodiment of the present patent application.
Figure 22:
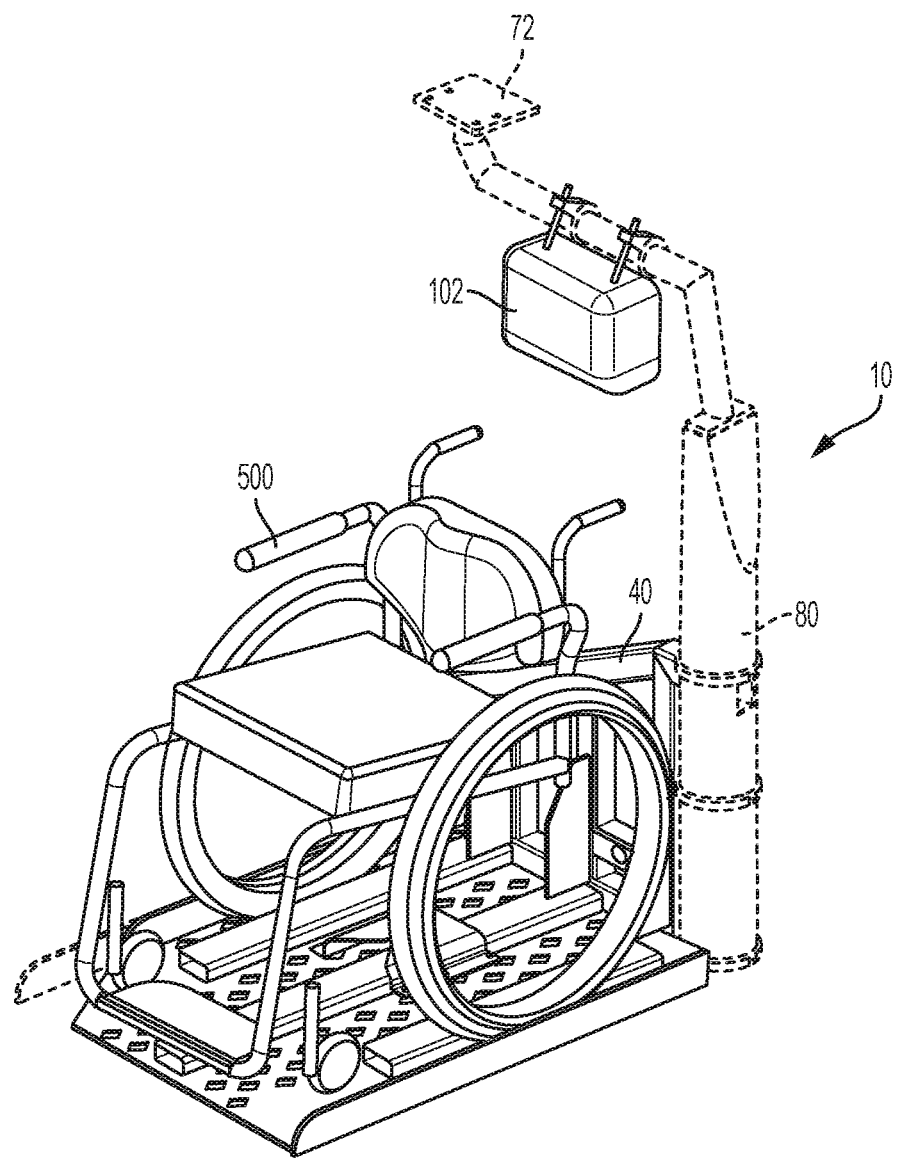
FIGS. 22 and 23 show a perspective view and a rear elevational view, respectively of the exemplary system with the integrated headrest and with an exemplary wheelchair disposed thereon in accordance with an embodiment of the present patent application.
Figure 23:
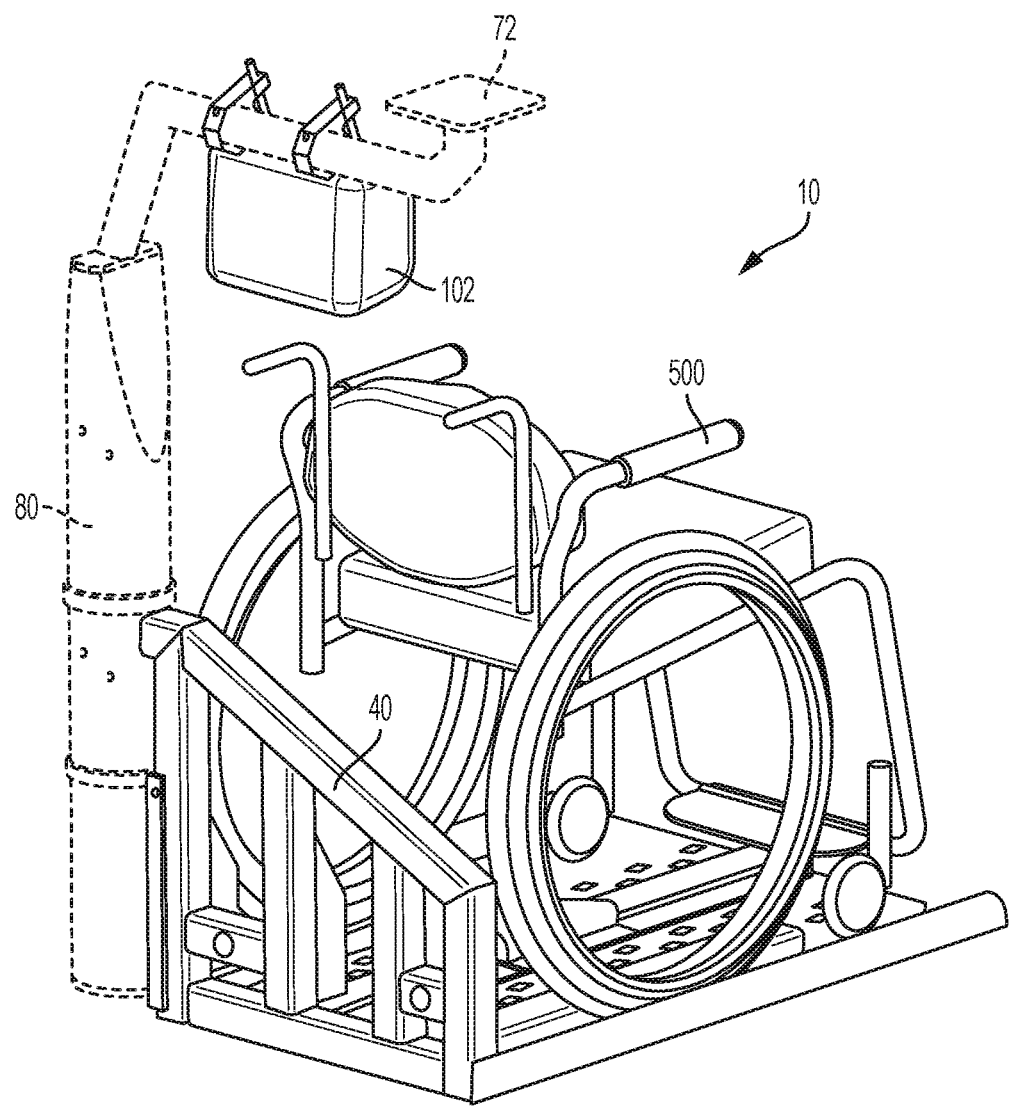
Figure 24:
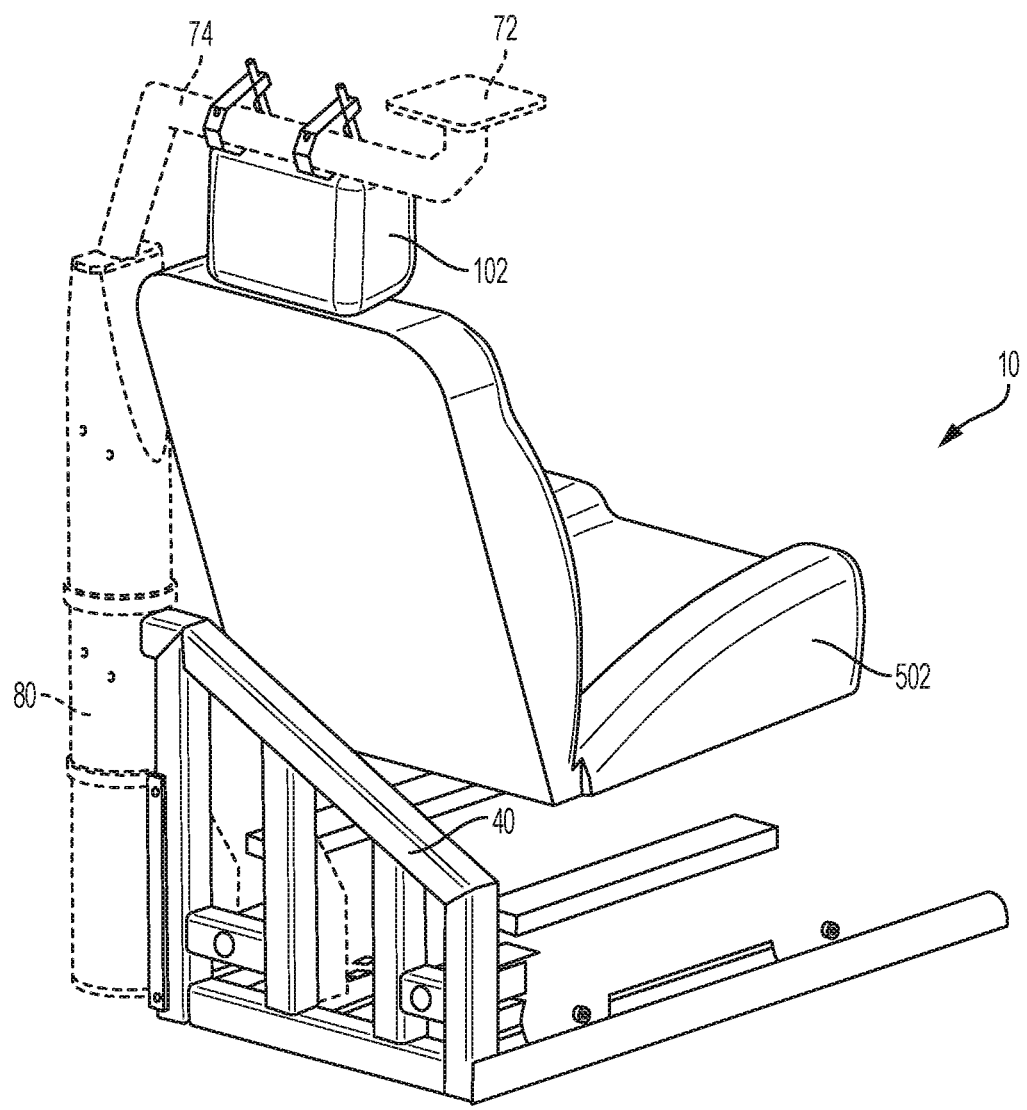
FIG. 24 shows a rear elevational view of the exemplary system with the integrated headrest and with another exemplary wheelchair disposed thereon in accordance with an embodiment of the present patent application.

FIGS. 1 through 3 show a system 10 for lifting a wheelchair 500 (e.g., as shown in FIGS. 22 and 23) or 502 (as shown in FIGS. 19, 20, and 24) into and out of a vehicle 12 is provided. The vehicle 12 has a vehicle body 14, a passenger side front seat region 16, a driver side front seat region 18, a movably connected passenger side door 20 closing the passenger side front seat region 16, and a movably connected driver side door 22 closing the driver side front seat region 18. The term front seat region is used in its conventional manner to denote the location of the forward most seats of the vehicle interior. The side doors 20 and 22 may be hingedly connected to the vehicle 12. The side doors 20 and 22 may be hinged horizontally or vertically and may be of any type.

Figure 8:
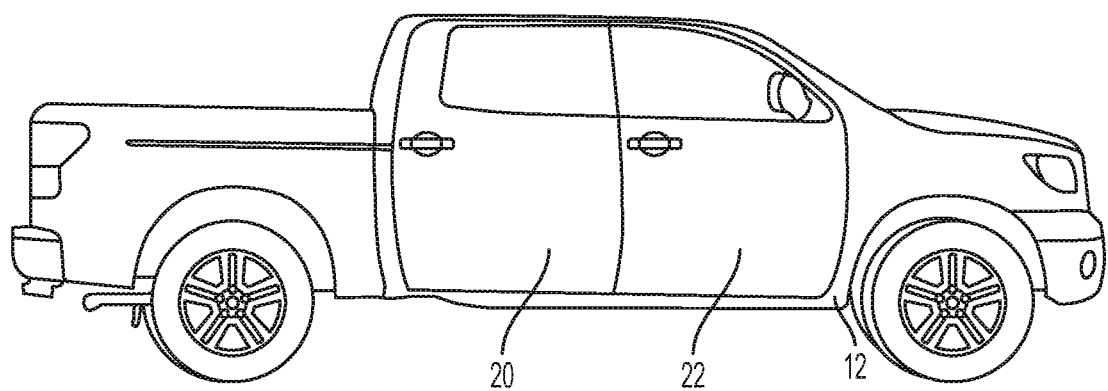
FIGS. 8-10 show a vehicle having the system for lifting the wheelchair into and out of the vehicle in accordance with an embodiment of the present patent application, wherein the vehicle includes side doors that are slidable together as a single sliding door unit, for example, as shown in FIG. 9.
Figure 9:
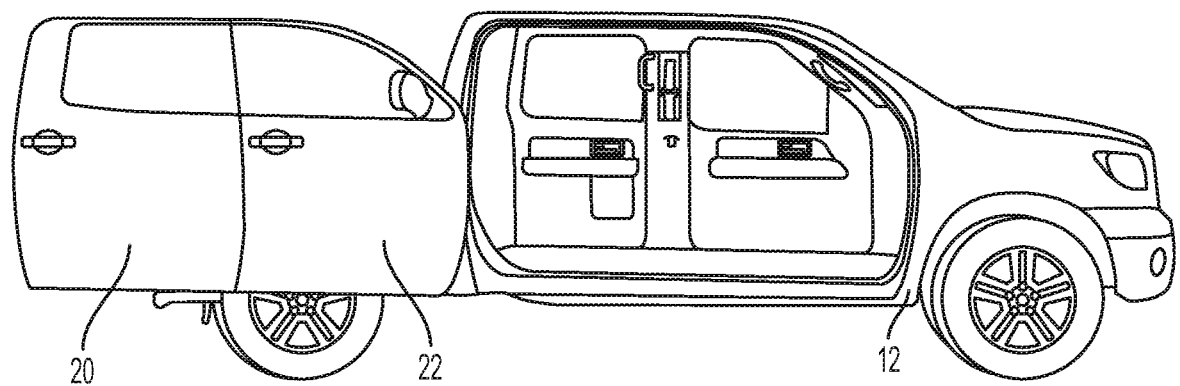
Figure 10:
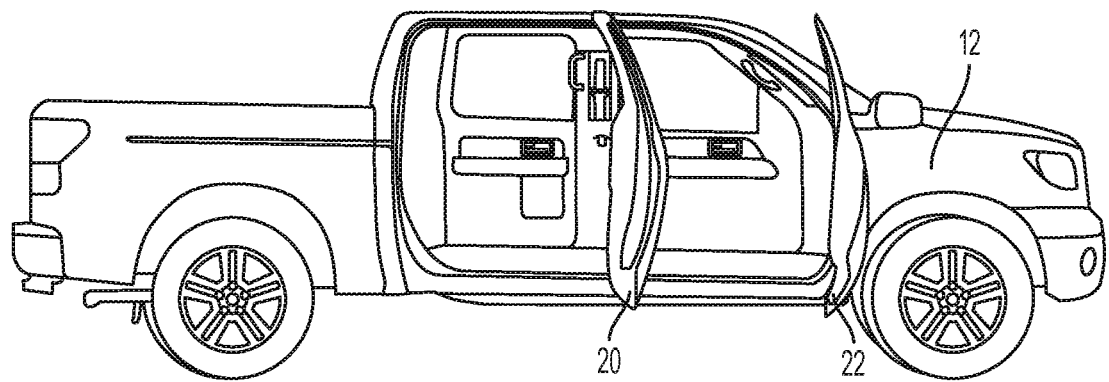

In some embodiments, the side doors 20 and 22 of the vehicle 12 may be slidably connected to the vehicle 12. For example, as shown in FIGS. 8-10, front and rear passenger side doors of the vehicle 12 may be combined into a single sliding/rolling door unit. Similarly, front and rear driver side doors of the vehicle 12 may be combined into a single sliding/rolling door unit. FIG. 8 shows the front and rear passenger side doors of the vehicle 12 in their closed position. FIG. 9 shows the front and rear passenger side doors of the vehicle 12 being slid open together as a single sliding/rolling door unit. FIG. 10 shows the front and rear passenger side doors of the vehicle 12 in their open position.

The system 10 is configured for lifting an occupied and/or unoccupied wheelchair 500 or 502 into and out of the vehicle 12. For example, the system 10 is configured for lifting a wheelchair that does not contain a passenger/user (i.e., unoccupied or empty) into and out of the vehicle 12. The system 10 is also configured for lifting a wheelchair with a passenger/user seated thereon into and out of the vehicle 12.

The system 10 includes a driver side wheelchair support 26 disposed in the driver side front seat region 18 of the vehicle 12 and a passenger side wheelchair support 28 disposed in the passenger side front seat region 16 of the vehicle 12.

The system 10 also includes a driver side extendable lift assembly 24a, a passenger side extendable lift assembly 24b, and a control system 25. Each of the driver side extendable lift assembly 24a and passenger side extendable lift assembly 24b is configured to articulate on its own.

The driver side extendable lift assembly 24a is operatively connected to the driver side wheelchair support 26 and the passenger side extendable lift assembly 24b is operatively connected to the passenger side wheelchair support 28. The driver side extendable lift assembly 24a is arranged to move the driver side wheelchair support 26 between a stowed position within the vehicle 12 and a deployed position extended horizontally and rotated outside the vehicle 12 and lowered towards the ground so the wheelchair can roll onto or off of it. The passenger side extendable lift assembly 24b is arranged to move the passenger side wheelchair support 28 between a stowed position within the vehicle and a deployed position extended horizontally and rotated outside the vehicle and lowered towards the ground. For example, the passenger side wheelchair support 28 is shown in its stowed position in FIG. 1 and the driver side wheelchair support 26 is shown in its deployed position in FIG. 6. In one embodiment, the wheelchair support is rotated about a vertical axis such that it is horizontally extended and outside the vehicle and lowered towards the ground when it is in the deployed position.

The system 10 may include a lift system 24 with a power source, a controller, and at least one extendable lift assembly 24a or 24b and preferably two extendable lift assemblies 24a, 24b with one on each side.

The controller and the power source of the lift system 24 may be referred to as the control system 25. The controller of the control system 25 may be powered by the power source. As will be clear from the discussions below, the power source may include a battery or generator of the vehicle 12 or an additional battery back-up system.

The control system 25 of the lift system 24 is configured to independently operate the driver side extendable lift assembly 24a and the passenger side extendable lift assembly 24b to separately or simultaneously move the driver side wheelchair support 26 and the passenger side wheelchair support 28 between their respective stowed positions and their respective deployed positions. That is, in one embodiment, the control system 25 is configured to operate the driver side and passenger side extendable lift assemblies 24a, 24b independently of another. The control system 25 may also be configured to simultaneously operate both the driver side extendable lift assembly 24a and the passenger side extendable lift assembly 24b.

Each of the driver side extendable lift assembly 24a and the passenger side extendable lift assembly 24b may include a first actuator 48 for providing a horizontal translation/movement for the respective wheelchair support, and a second actuator 101 for providing a vertical translation/movement and a rotational movement for the respective wheelchair support. The second actuator may include two actuators (referred to as the second actuator and the third actuator)—one configured to provide rotational movement and the other configured to provide the vertical translation/movement of the wheelchair support 26, 28.

The system 10 provides a side-entry configuration for the wheelchair supports 26, 28. That is, the wheelchair supports 26, 28 are generally configured to move between their respective stowed and deployed positions through lateral side(s) of the vehicle. Thus, as used herein, the term "side" refers to lateral sides and not front/rear ends of the vehicle. For example, the side doorways of the vehicle may include driver front side, driver rear side, passenger front side, and passenger rear side, and each of these side doorways has a door closing/opening it.

In the illustrated embodiments of FIGS. 1-3, the wheelchair supports 26, 28 are only shown in the driver and passenger sides of the front seat regions. It is also contemplated that the wheelchair supports of the present patent application may be disposed in the driver side rear seat region (e.g., positioned behind the driver side front seat region) and in the passenger side rear seat region (e.g., positioned behind the passenger side front seat region). For example, the vehicle 12 may include the wheelchair supports disposed only in the driver side front seat region and in the passenger side front seat region. In another embodiment, the vehicle 12 may include the wheelchair supports disposed only in the driver side rear seat region and in the passenger side rear seat region. In yet another embodiment, the vehicle 12 may include the wheelchair supports disposed both in the driver side front and rear seat regions and in the passenger side front and rear seat regions. In the embodiments where the wheelchair supports are disposed in the passenger side rear seat region and the driver side rear seat region, the vehicle also includes a movably connected passenger rear side door closing the passenger side rear seat region and a movably connected driver rear side door closing the driver side rear seat region so as to provide the side-entry configuration. Like the passenger and driver front side doors, the passenger and driver rear side doors are configured to be either hingedly or slideably connected to the vehicle 12. The vehicle as described herein may include coupes, sedans, pick-up trucks, minivans, two door vehicles, four door vehicles, passenger vans, station wagons, sport utility vehicles (SUVs), hatchbacks, crossovers, or any other type of vehicles or automobiles as would be appreciated by one skilled in the art. Also, as would be appreciated by one skilled in the art, referring to FIG. 3, the vehicle 12 generally includes a floor pan 13, a roof 19, and a body frame 17. The vehicle 12 has a vehicle longitudinal axis VL-VL that extends from front to rear of the vehicle 12 also as shown in FIG. 3.

In one embodiment, the vehicle 12 may be initially assembled to include the system 10 of the present patent application. In another embodiment, the vehicle 12 may be converted or modified to include the system 10 of the present patent application. That is, the system 10 may be configured to be easily retrofitted to the existing vehicles. In one embodiment, the vehicle 12 may include some modifications to accommodate the system 10. For example, the floor and/or the frame of the vehicle 12 may be modified to make room for the lift system 24.

The modifications to the vehicle 12 may also include a modified vehicle floor pan 13. For example, the modified vehicle floor pan 13 is generally shaped and configured to receive and support the wheelchair supports 26, 28 and the extendable lift assemblies 24a, 24b thereon. The existing vehicle floor pan disposed on the vehicle frame 17 may be removed (or cut out) and the new, modified vehicle floor pan 13 may be installed on the vehicle frame 17. Preferably, this can be done with no impact to the vehicle frame itself. In one embodiment, the modified vehicle floor pan 13 may be part of the system 10. The modified vehicle floor pan 13 may include a large sheet metal stamping (which may be formed from smaller welded sheet metal stampings) to form the modified floor of the vehicle 12. In another embodiment, the modified floor pan 13 may be formed from aluminum or composite materials. The modified vehicle floor pan 13 may be shaped to include a transmission tunnel 15 that generally runs parallel to the vehicle longitudinal axis VL-VL and between the passenger side seat region and the driver side seat region of the vehicle 12 and is configured to accommodate transmission and driveshaft of the vehicle 12. As would be appreciated by one skilled in the art, the modified vehicle floor pan 13 may be provided with attachment devices (e.g., adhesive, fasteners, etc.) for connecting the modified vehicle floor pan 13 to a portion of the vehicle frame 17.

In one embodiment, the vehicle 12 may include a modified suspension that allows the vehicle frame 17 to rest on the ground. This may be accomplished through an air suspension system, a hydraulic suspension system or some other means configured to cause the suspension travel, and thereby reduce the vertical travel necessary for the wheelchair support system. In one embodiment, the vehicle frame 17 of the vehicle 12 may be partially cut in the floor area to allow room for the lift system 24. The vehicle may generally include a system of belts for restraining occupants seated in the wheelchairs. The vehicle may include a belt-type occupant-restraint system with both a vehicle-anchored pelvic belt and one or more vehicle-anchored shoulder belts.

Each of the wheelchair supports 26, 28 includes the stowed position within the vehicle 12. For example, FIGS. 2 and 3 show both the wheelchair supports 26, 28 in their respective stowed positions within the vehicle 12. FIG. 1 shows the wheelchair support 28 in its respective stowed position, while the wheelchair support 26 is in an extended intermediate position. The stowed position may also be referred to as a retracted position. When the wheelchair supports 26, 28 are in their respective stowed positions, the wheelchair supports 26, 28 are completely inside the vehicle 12 and locked in their positions, allowing the doors of the vehicle 12 to be fully closed. Also, when the wheelchair supports 26, 28 are in their respective stowed positions, the wheelchair supports 26, 28 are level with the vehicle compartment/floor and are generally pointing towards the front/dashboard of the vehicle 12.

Figure 6:
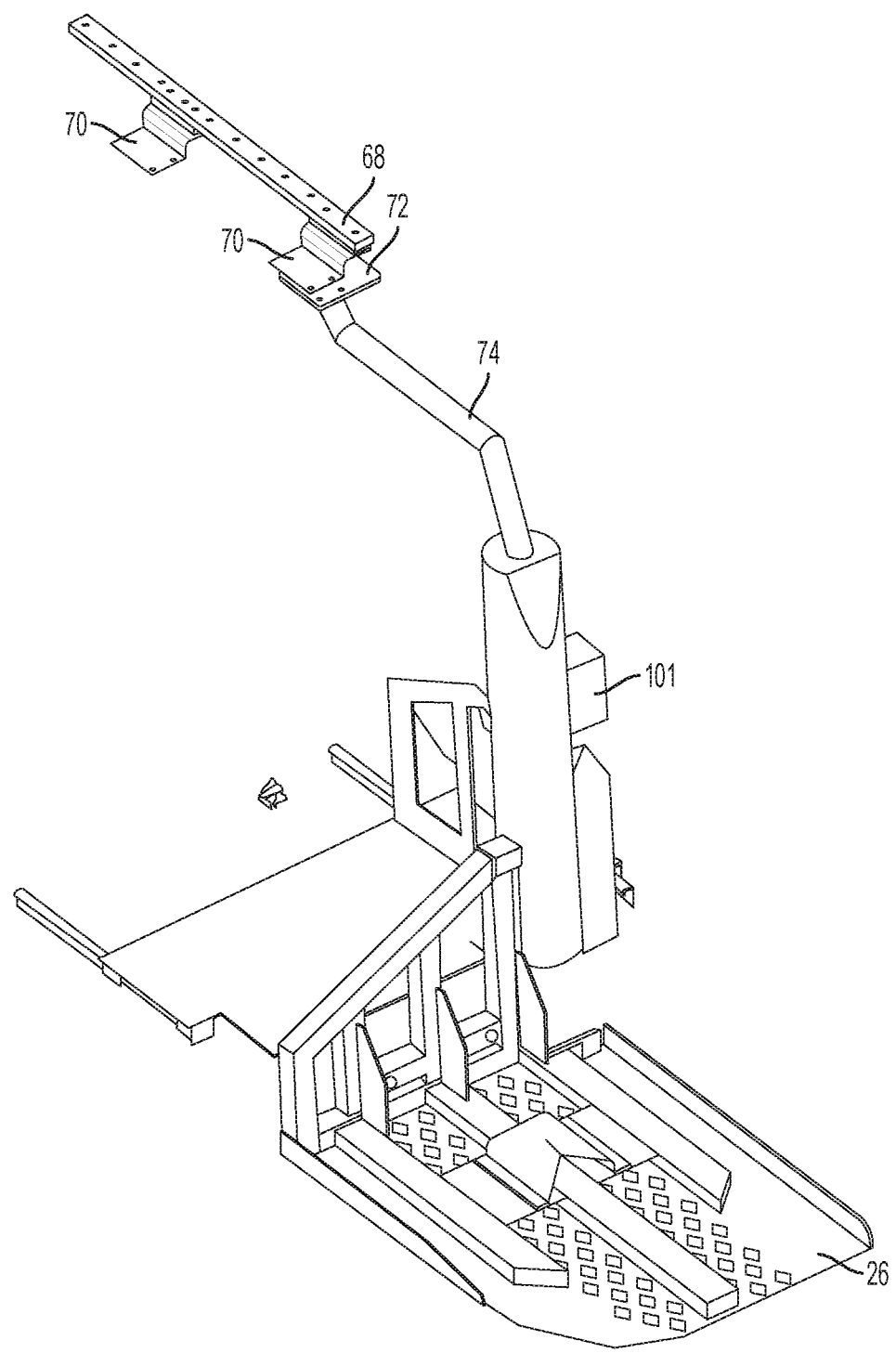
FIG. 6 is a partial perspective view of the system for lifting the wheelchair into and out of the vehicle in accordance with an embodiment of the present patent application, wherein some portions of the system are not shown to better illustrate remaining portions of the system and wherein the driver side wheelchair support is shown in its deployed position outside the vehicle.
Figure 7:
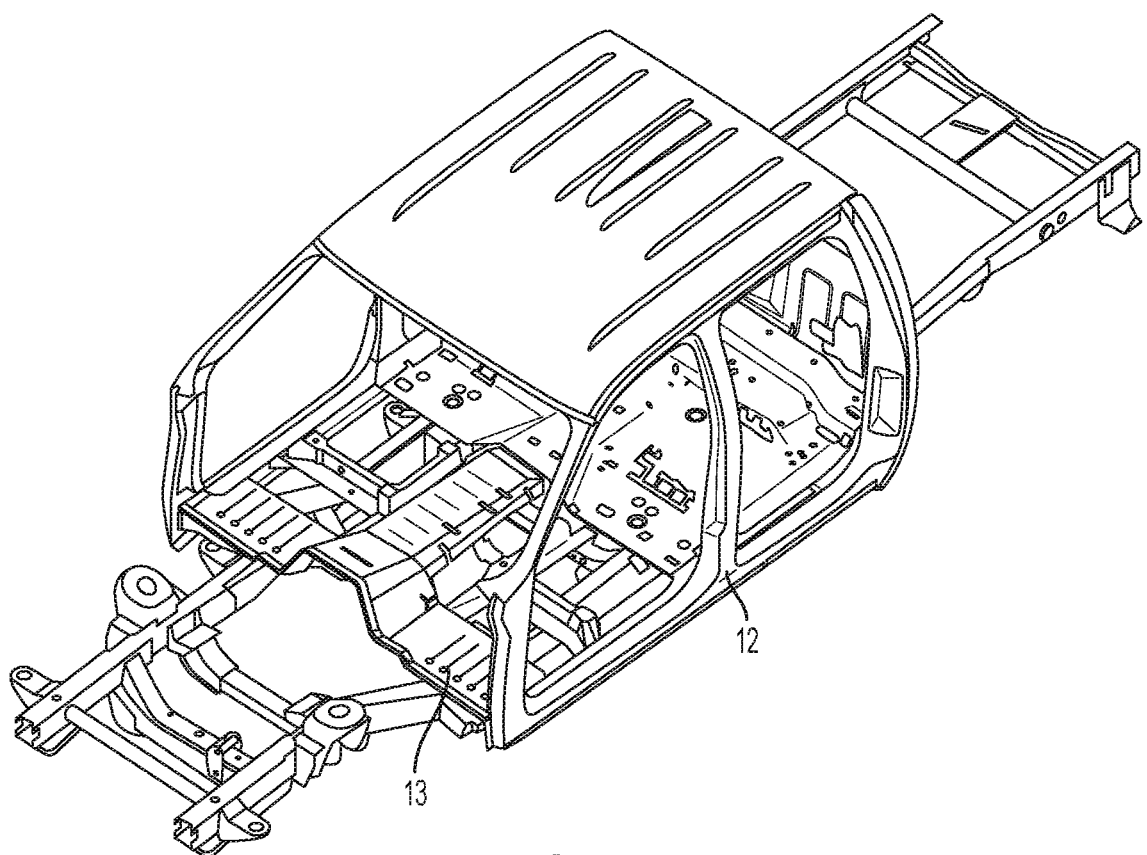
FIG. 7 is a perspective view of a vehicle body showing modifications to receive and support the system for lifting the wheelchair of the present patent application.

Each of the wheelchair supports 26, 28 includes the deployed position extended outside the vehicle 12 and lowered so the planar base member 30 is on or immediately adjacent the ground. For example, the deployed position may be a lower level/position at ground or street (adjacent to the vehicle 12) level. When the wheelchair supports 26, 28 are in their respective deployed positions, the wheelchair supports 26, 28 are on the ground next to the vehicle 12. FIG. 6 shows the wheelchair support 26 is in its deployed position.

The wheelchair supports 26, 28 may each include two or more intermediate positions between their stowed positions and their deployed positions. For example, the two or more intermediate positions may include a generally horizontally extended position and a rotationally extended position.

Figure 4:
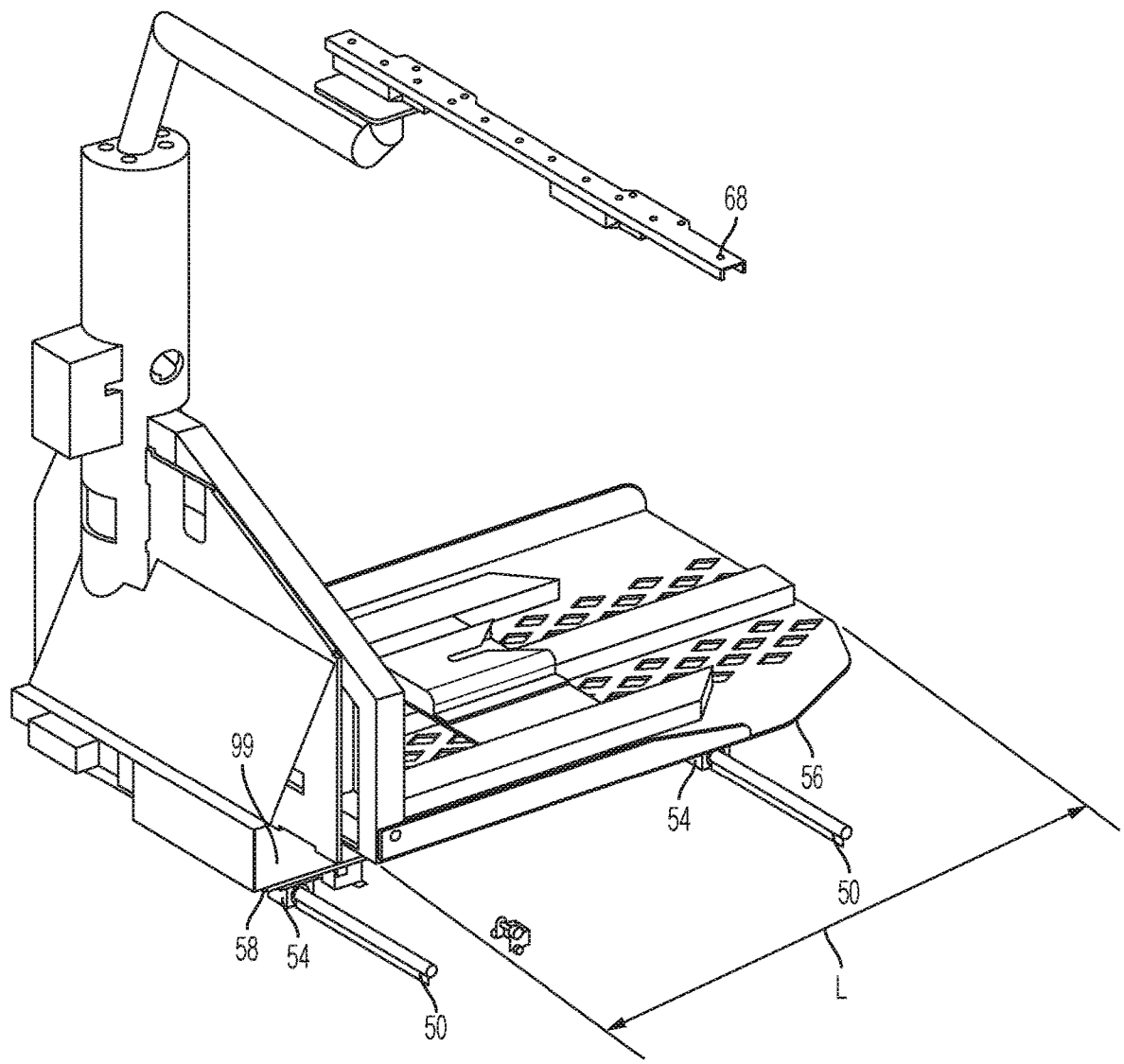
FIG. 4 is a partial perspective view of the system for lifting the wheelchair into and out of the vehicle in accordance with an embodiment of the present patent application, wherein some portions of the system are not shown to better illustrate remaining portions of the system and wherein the driver side wheelchair support is shown in its generally horizontally extended position.

As will be explained in detail in the discussions below, each extendable lift assembly 24a, 24b is configured to horizontally translate or move the wheelchair supports 26, 28 in a linear manner from their stowed positions to their generally horizontally extended positions. This horizontal translation or movement of the wheelchair supports 26, 28 takes place along a first axis HT-HT that is perpendicular to the vehicle longitudinal axis VL-VL and is parallel to a generally horizontal plane of the ground. When the wheelchair supports 26, 28 are in their generally horizontally extended positions, the wheelchair supports 26, 28 are still level with the vehicle compartment/floor and are generally pointing towards the front/dashboard of the vehicle 12. FIG. 1 shows the wheelchair support 26 is in its generally horizontally extended position, while the wheelchair support 28 is in its respective stowed position. FIG. 4 also shows the wheelchair support 26 is in its generally horizontally extended position.

Figure 5:
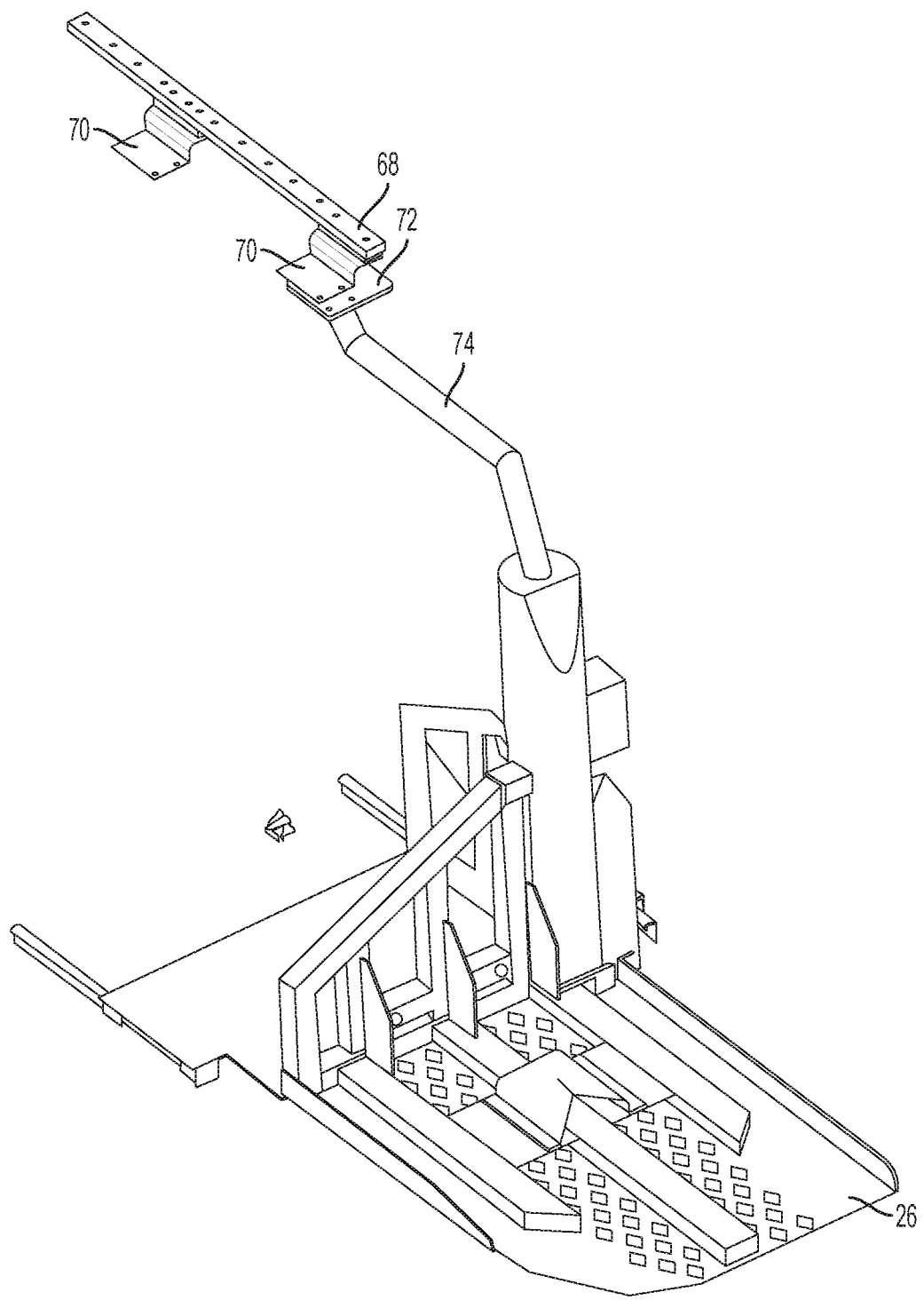
FIG. 5 is a partial perspective view of the system for lifting the wheelchair into and out of the vehicle in accordance with an embodiment of the present patent application, wherein some portions of the system are not shown to better illustrate remaining portions of the system and wherein the driver side wheelchair support is shown in its rotationally extended position.

Also, as will be explained in detail in the discussions below, each extendable lift assembly 24a, 24b is configured to rotationally move the wheelchair supports 26, 28 from their generally horizontally extended positions to their generally rotationally extended positions. This rotational translation or movement of the wheelchair supports 26, 28 takes place along a second axis RM-RM that is perpendicular to the vehicle longitudinal axis VL-VL (i.e., vertical/perpendicular to the generally horizontal plane of the ground). When the wheelchair supports 26, 28 are in their generally rotationally extended positions, the wheelchair supports 26, 28 are still level with the vehicle compartment/floor and generally extend outwardly from the side(s) of the vehicle 12 (when the doors are opened). FIG. 5 shows the wheelchair support 26 is in its generally rotationally extended position.

In one embodiment, the wheelchair supports 26, 28 rotate about the second axis RM-RM outwardly from the vehicle 12. In one embodiment, the wheelchair supports 26, 28 rotate through 90 degrees from their generally horizontally extended positions. In another embodiment, the wheelchair supports 26, 28 rotate through any angle between 30 and 90 degrees from their generally horizontally extended positions. In another embodiment, the wheelchair supports 26, 28 rotate through any angle between 45 and 90 degrees from their generally horizontally extended positions.

The system 10 is configured to support a three-wheeled wheelchair or a four-wheeled wheelchair. The system 10 is configured to support a motorized or electrically powered wheelchair or a manual propulsion wheelchair. The system 10 is also configured to support a mobility scooter. The wheelchair supported by the system 10 may generally include a frame, a set of wheels/rollers rotatably attached to the frame, a seat and a backrest both disposed on the frame, and foot rests. The set of wheels/rollers may include caster wheels at the front of the frame and two large wheels at the back of the wheelchair frame. The wheelchair may include a wheelchair-anchored pelvic-belt restraint to which the vehicle-anchored shoulder belt can be readily connected.

For example, FIGS. 22 and 23 show the system 10 configured to support an exemplary wheelchair 500 thereon. FIGS. 19, 20 and 24 show the system 10 configured to support another exemplary wheelchair 502 thereon.

The system 10 includes a wheelchair restraint system 46 that is configured to restrain or secure the wheelchair from further movement once the wheelchair is in a desired position on the respective wheelchair support 26, 28. For example, the wheelchair may be restrained or secured in a stationary position on the respective wheelchair support 26 or 28 using the restraint system 46. The wheelchair restraint system 46 is configured to lockingly engage a portion of the frame of wheelchair (e.g., extending downwardly towards the wheelchair support 26, 28). In one embodiment, the wheelchair restraint system 46 may include a four-point, strap-type tie down system. The wheelchair restraint system 46 may include any wheelchair securement system as would be appreciated by one skilled in the art. The wheelchair restraint system 46 is configured to provide effective frontal-crash protection for forward-facing occupants (including driver and/or passengers) in wheelchairs. The wheelchair restraint system 46 is configured to provide increased safety and security for occupants seated in wheelchairs during normal travel, emergency vehicle maneuvers, and other types of crashes, such as vehicle rollovers and side impacts. A standard car seat may be adapted to be mounted to the restraint system so a non-disabled person can sit on a regular car seat.

The wheelchair restraint system 46 may also be configured to be adjustable along the length of the wheelchair support 26, 28 and locked at a desired position along the length of the wheelchair support 26, 28. This configuration enables the wheelchair occupant to adjust the distance of the wheelchair with respect to the steering wheel, dash panel or front seat in accordance with their convenience. The adjustable configuration of the wheelchair restraint system 46 allows the wheelchair occupant to position the wheelchair at a desired distance from the steering wheel, dash panel or front seat.

Figure 12:
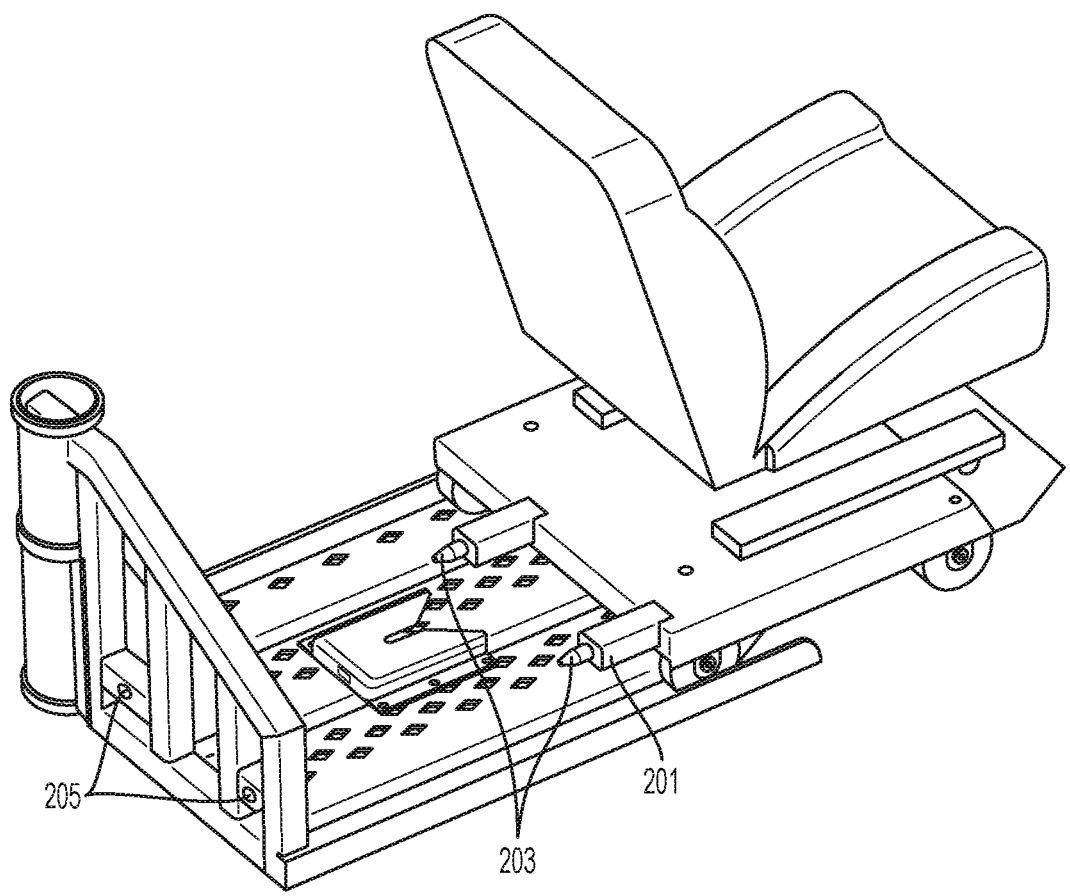
FIGS. 12 and 13 show a seat/wheelchair restraining system that is used to restrain the seat/wheelchair being lifted into and out of the vehicle in accordance with an embodiment of the present patent application, wherein the seat/wheelchair is in an unlocked configuration in FIG. 12 and the seat/wheelchair is in a locked configuration in FIG. 13.
Figure 13:
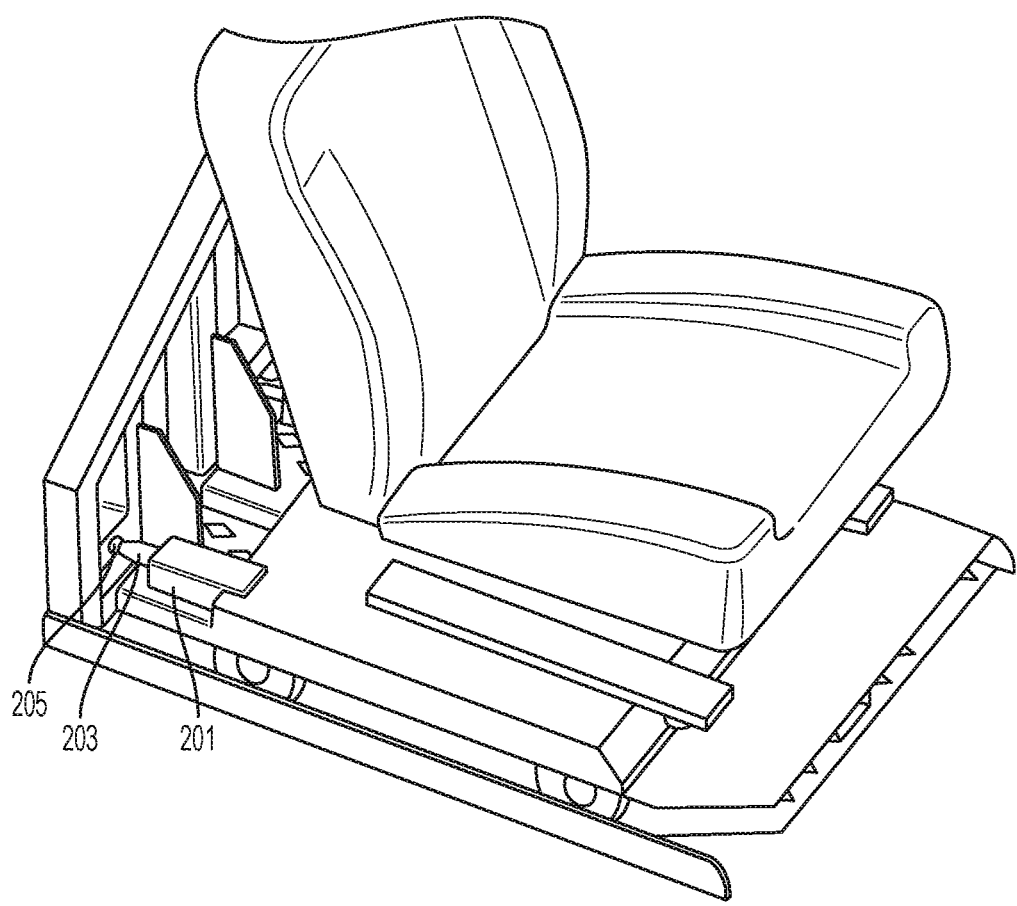

FIGS. 12 and 13 show a seat/wheelchair restraint system 201 that is used to restrain the seat/wheelchair being lifted into and out of the vehicle 12 in accordance with another embodiment. The seat/wheelchair restraint system 201 includes lock members 203 positioned on one of the chair/wheelchair and portions of the system 10 and lock engaging members 205 positioned on the other of the chair/wheelchair and portions of the system 10. The seat/wheelchair restraint system 201 includes a lock position (as shown in FIG. 13) in which the lock members 203 are configured to be engaged with lock engaging members 205 to prevent the chair/wheelchair from having rotational movement about an axis normal to the wheelchair supports 26, 28 (generally planar base member 30). That is, once the seat/wheelchair is in a desired, locked position on the respective wheelchair support, the lock members 203 engage with lock engaging members 205 to prevent the chair/wheelchair from having any rotational movement about the axis normal to the wheelchair supports 26, 28. The seat/wheelchair restraint system 201 also includes an unlock position (as shown in FIG. 12) in which the lock members 203 are configured to be disengaged from lock engaging members 205 to unlock the chair/wheelchair from the respective wheelchair support.

In some embodiments, the lock members 203 and the lock engaging members 205 are configured to essentially eliminate the rotational degree of freedom of the wheelchair. The prior art EZ-Locks and Q-Locks allow the wheelchair (or vehicle seat) to rotate within the EZ-Lock or Q-Lock. By contrast, the lock members 203 and the lock engaging members 205 of the present patent application are configured to eliminate this rotational degree of freedom. This configuration better secures the seat/wheelchair so that, in the aggressive driving conditions, the occupant does not experience the seat/wheelchair shifting around beneath them. The lock members 203 and the lock engaging members 205 of the present patent application are also configured to eliminate any pesky noise and rattles.

The wheelchair supports 26, 28 may also be referred to as wheelchair platforms. The structure, construction and operation of the passenger side wheelchair support 28 are same as those of the driver side wheelchair support 26. The wheelchair support 26, 28 includes a generally planar base member 30, side flange members 32 and 34, a rear flange member 36 and a rear support member 40.

The planar base member 30 is configured to support the load of both the wheelchair and its occupant thereon and may also be referred to as a load bearing member. The base member 30 may include non-slip (or anti-skid) surfaces thereon to provide traction to the wheelchair disposed thereon and prevent/reduce slippage of the wheelchair disposed thereon. The planar base member 30 may include a plurality of openings 42 that are configured to provide ventilation and drainage of water. These openings 42 are also configured to eliminate any deposition of dust/debris on the wheelchair support 26, 28. These openings 42 may also be used by the wheelchair occupant to view any obstacles under the wheelchair support 26, 28 when the wheelchair support 26, 28 is translating vertically downwards to its deployed extended position on the ground and outside the vehicle. 12

In one embodiment, the wheelchair support 26, 28 may be made from metal materials such as steel, aluminum or titanium materials. In another embodiment, the wheelchair support 26, 28 may be made from polymer materials, composite materials or carbon filament materials. In one embodiment, the wheelchair support 26, 28 may include textured or anti-slip coatings thereon to prevent slippage and provide traction to the wheelchair disposed thereon. The coatings are optional.

In one embodiment, the wheelchair support 26, 28 may have a lifting capacity of 1000 pounds (lbs). In one embodiment, the wheelchair support 26, 28 may have a width W of 26.625 inches. In one embodiment, the wheelchair support 26, 28 may have a width W in the range of about 25 to 34 inches. In one embodiment, as shown in FIG. 4, the wheelchair support 26, 28 may have a length L of 38.75 inches. In one embodiment, the wheelchair support 26, 28 may have a length L in the range of about 37 to 54 inches.

The side flange members 32 and 34, the rear flange member 36 and the rear support member 40 are configured to keep the wheelchair (disposed on the base member 30) confined on (and from rolling off) the wheelchair support 26.

For example, the rear support member 40 is configured to provide a rear support behind the wheelchair disposed on the wheelchair support 26. The rear support member 40 may include a plurality of members 44 (e.g., having tubular configuration) that are attached to the base member 30 at their respective lower end portions. The plurality of members 44 may include vertical, horizontal and/or angularly oriented members. The rear support member 40 may have generally trapezoidal configuration as shown in FIG. 1. In other embodiments, the rear support member 40 may have other shaped configurations. In one embodiment, one 44a of the members 44 of the rear support member 40 is operatively connected to an inner tubular member 84 of the extendable lift assembly 24a, 24b.

Thus, the rear support member 40 is a structural member and configured to provide integrity as the joint that ties the base member 30 to the rotation member such that the base member 30 remains as planar as possible in its cantilever configuration. That is, the rear support member 40 is configured to act as a structural member for the cantilevered platform/base member 30.

The system 10 may also include a roof support member 62 and a guide member 68. The roof support member 62 is configured to be fixedly connected to the roof of the vehicle 12. The roof support member 62 includes a top surface 64 and a bottom surface 66. The top surface 64 of the roof support member 62 is connected to an inner surface of the roof of the vehicle 12. The bottom surface 66 of the roof support member 62 includes the guide member 68 (as shown in FIG. 4) disposed thereon. The guide member 68 is configured to guide a portion of each extendable lift assembly 24a, 24b during the horizontal translational movement of the wheelchair support 26, 28. For example, referring to FIG. 5, a pair of guide engagement members 70 of the system 10 is configured for sliding engagement with the guide member 68. Each guide engagement member 70 is disposed on an end portion 72 of a vertical support member 74 of the each extendable lift assembly 24a, 24b.

In one embodiment, each extendable lift assembly 24a, 24b includes the guide engagement member 70, vertical support members 74 (and their end portions 72), a rotational movement and vertical translation system 80, a linear actuator 48, and guide engagement members 54. The structure, configuration and operation of each of these components or portions of each extendable lift assembly 24a, 24b are described in detail below. Also, each extendable lift assembly 24a, 24b may be configured to be a bolt-in module so it is easy to remove and replace each extendable lift assembly 24a, 24b for servicing/maintenance and it is easy to remove and re-install each extendable lift assembly 24a, 24b to permit flexible configuration in the vehicle 12. This design also allows universally configuring the seating options of the vehicle. For example, in the case of autonomous public transport, the vehicle may be configured "on demand" to match the requested seat configuration of the ride caller. The extendable lift assembly 24a, 24b may be configured to be simultaneously installed on both the driver and passenger side.

In one embodiment, the roof mount arrangement including the roof support member 62, the vertical support members 74 (and their end portions 72) and a sliding mount arrangement (including the guide member 68 and the pair of guide engagement members 70) together are configured to help distribute the load of the wheelchair support 26, 28 (with the wheelchair and its occupant thereon) between the roof and the floor of the vehicle 12. The roof mount arrangement of the system 10 also enables the system 10 to be attached to the vehicle by simply replacing the existing vehicle floor pan with the modified vehicle floor pan.

The system 10 includes a lift base member 52 that is configured to be fixedly connected to the modified vehicle floor pan 13. The lift base member 52 includes a top surface and a bottom surface, where the bottom surface is connected to the modified vehicle floor pan 13. The top surface of the lift base member 52 includes guide members 50 disposed thereon. The guide members 50 are spaced apart and are generally parallel to each other.

The actuator 48 and the guide members 50 are configured to provide a horizontal translational movement (e.g., in the direction of the axis HT-HT) of each of the wheelchair support 26, 28. The actuator 48 is configured to drive or move the wheelchair support 26, 28 along the first axis HT-HT and the guide members 50 are configured to guide the wheelchair support 26, 28 during the horizontal translational movement thereof.

The actuator 48 may be referred to as a first actuator. The actuator 48 may be a hydraulic, an electric, or a pneumatic actuator. The actuator 48 may generally include a cylinder and a piston disposed in the cylinder. The piston is configured to extend from and retract into the cylinder. One end of the piston is configured to be attached (e.g., using a bracket or otherwise) to a bottom surface 56 of the wheelchair support 26, 28. The system 10 may include a hydraulic bulkhead 78 that is configured to route all the hydraulics to the extendable lift assemblies 24a, 24b. Hoses of all hydraulic equipment of the extendable lift assemblies 24a, 24b are configured to be connected to the bulkhead 78. The length of the hoses may be sized and configured to allow unrestricted movement of the wheelchair supports 26, 28.

In one embodiment, when the actuator is an electric actuator, it is appreciated by one skilled in the art that the electric motor or solenoid of the actuator may be powered by the vehicle electrical system (e.g., battery or generator) or may be powered by an additional battery back-up system.

The guide engagement members 54 are guided for displacement on the guide members 50. The guide engagement member 54 has a generally U-shaped cross-sectional configuration, where the sides of the generally U-shaped guide engagement member 54 engage at least partially over the guide member 50. For example, the guide member 50 may have grooves on its sides that are configured to engage with the portions on the sides of the generally U-shaped guide engagement member 54.

One of the guide engagement members 54 may be attached on the bottom surface 56 of the wheelchair support 26, 28. The other of the linear guide engagement members 54 may be attached on a bottom surface 58 of a member 99 (as shown in FIG. 4) of the extendable lift assembly 24a or 24b. The member 99 is also configured to horizontally translate with the wheelchair support 26, 28 when the wheelchair support 26, 28 moves horizontally from its respective stowed position to its respective generally horizontally extended position.

When the actuator 48 is actuated, the actuator 48 drives the piston along the first axis HT-HT. The wheelchair support 26, 28, attached to the one end of the piston, also translates/moves horizontally along the first axis HT-HT. During this horizontal translation/movement of the wheelchair support 26, 28, the wheelchair support 26, 28 is guided by the sliding engagement between the guide engagement members 54 and the guide members 50 near the floor of the vehicle and by the sliding engagement between the guide engagement member 70 and the guide member 68 near the roof of the vehicle. Thus, when the actuator 48 is actuated, the respective wheelchair support 26, 28 is moved from its stowed position to its generally horizontally extended position.

The system 10 may include a proximity sensor 60 that is configured for providing a signal indicating that the actuator 48 is near a portion of its range of motion. The proximity sensor 60 and the actuator 48 are operatively connected to a computer system of the system 10. The proximity sensor 60 is configured to sense the position of the actuator 48 and to transmit a signal related to the position of the actuator 48 to the computer system. The computer system is configured for controlling the actuator 48 in response to a signal from the proximity sensor 60. The proximity sensor may be any sensor as would be appreciated by one skilled in the art. The proximity sensor may include one or more sensors.

Each extendable lift assembly 24a, 24b includes the rotational movement and vertical translation system 80. The system 80 may include an outer tubular member 82 and an inner tubular member 84. The inner tubular member 82 may be slidably disposed inside the outer tubular member 82 so as to form a tubular telescopic arrangement as would be appreciated by one skilled in the art. The telescopic arrangement of tubular members is configured to facilitate the vertical translational adjustment of the wheelchair support 26, 28, for example, between its rotationally extended position and its deployed position. The outer tubular member 82 and inner tubular member 84 may be hollow tubes having any cross sectional configuration as would be appreciated by one skilled in the art.

The outer tubular member 82, at its upper portion, is connected to the roof of the vehicle 12, for example, via the vertical support member 74, the guide engagement member 70 and the guide member 68. The outer tubular member 82, at its bottom portion, is connected to the member 99. This configuration of the outer tubular member 82 allows the outer tubular member 82 to horizontally translate along with the wheelchair support 26, 28 between the wheelchair support's stowed position and the wheelchair support's generally horizontally extended position. The outer tubular member 82 is configured to remain fixed in its position during the movement of the wheelchair support 26, 28 1) between the generally horizontally extended position and the rotationally extended position and 2) between the rotationally extended position and the deployed position.

Bearings may be used to prevent rotation between the inner tubular member 84 and the outer tubular member 82 under loading. For example, bearings are configured to prevent rotation between the inner tubular member 84 and the outer tubular member 82 when the wheelchair support 26, 28 1) horizontally translates between the stowed position and the generally horizontally extended position; and 2) vertically translates between the rotationally extended position and the deployed position. Bearings may be supported by or mounted on the outer tubular member 82 and in rotatable contact with the inner tubular member 84 to facilitate movement of the inner tubular member 84 through the outer tubular member 82. Thus, the outer tubular member and the inner tubular member are arranged together so as to allow the inner tubular member 84 to slide longitudinally (or translate vertically) on the outer tubular member 82 and also to prevent the inner tubular member 84 from rotation or turning about the outer tubular member 82.

In some embodiments, the system 10 may include a single cylinder (e.g., hydraulic or pneumatic) arrangement that is configured to provide both the vertical translation and rotational movement to the respective wheelchair supports 26, 28.

The inner tubular member 84 is connected to the wheelchair support 26, 28 via the rear support member 40 of the wheelchair support 26, 28. This configuration of the inner tubular member 84 enables the inner tubular member 84 to horizontally translate along with the wheelchair support 26, 28 between the wheelchair support's stowed position and the wheelchair support's generally horizontally extended position. This configuration of the inner tubular member 84 also enables the inner tubular member 84 to vertically translate and rotationally move along with the wheelchair support 26, 28. Also secured to the inner tubular member 84 is a drive mechanism 101, such as an actuator, for providing desired power to rotate, lift, extend, move, adjust, translate, etc.

The drive mechanism 101 is configured to rotate the inner tubular member 84 with respect to the outer tubular member 82 so that the wheelchair support 26, 28 connected to the inner tubular member 84 rotationally moves from the generally horizontally extended position to the rotationally extended position. The drive mechanism 101 is also configured to move the inner tubular member 84 with respect to the outer tubular member 82 so that the wheelchair support 26, 28 connected to the inner tubular member 84 vertically translates from the rotationally extended position to the deployed position.

The drive mechanism 101 may be referred to as the second actuator. The drive mechanism 101 may include two actuators (referred to as the second actuator and the third actuator)—one configured to provide rotational movement and the other configured to provide the vertical translation of the wheelchair support 26, 28.

In one embodiment, when the drive mechanism 101 is an electric actuator, it is appreciated by one skilled in the art that the electric motor or solenoid of the drive mechanism 101 may be powered by the vehicle electrical system (e.g., battery or generator) or may be powered by an additional battery back-up system.

The system 10 may include a control box assembly 88 (as shown in FIG. 2) that is configured to house controls and components for the air ride suspension, hydraulics for the actuator, electrical systems for the sensors and/or the drive mechanism, and any other systems. The control box assembly 88 may be mounted in the bed of the vehicle 12 as shown in FIG. 2.

Figure 11:
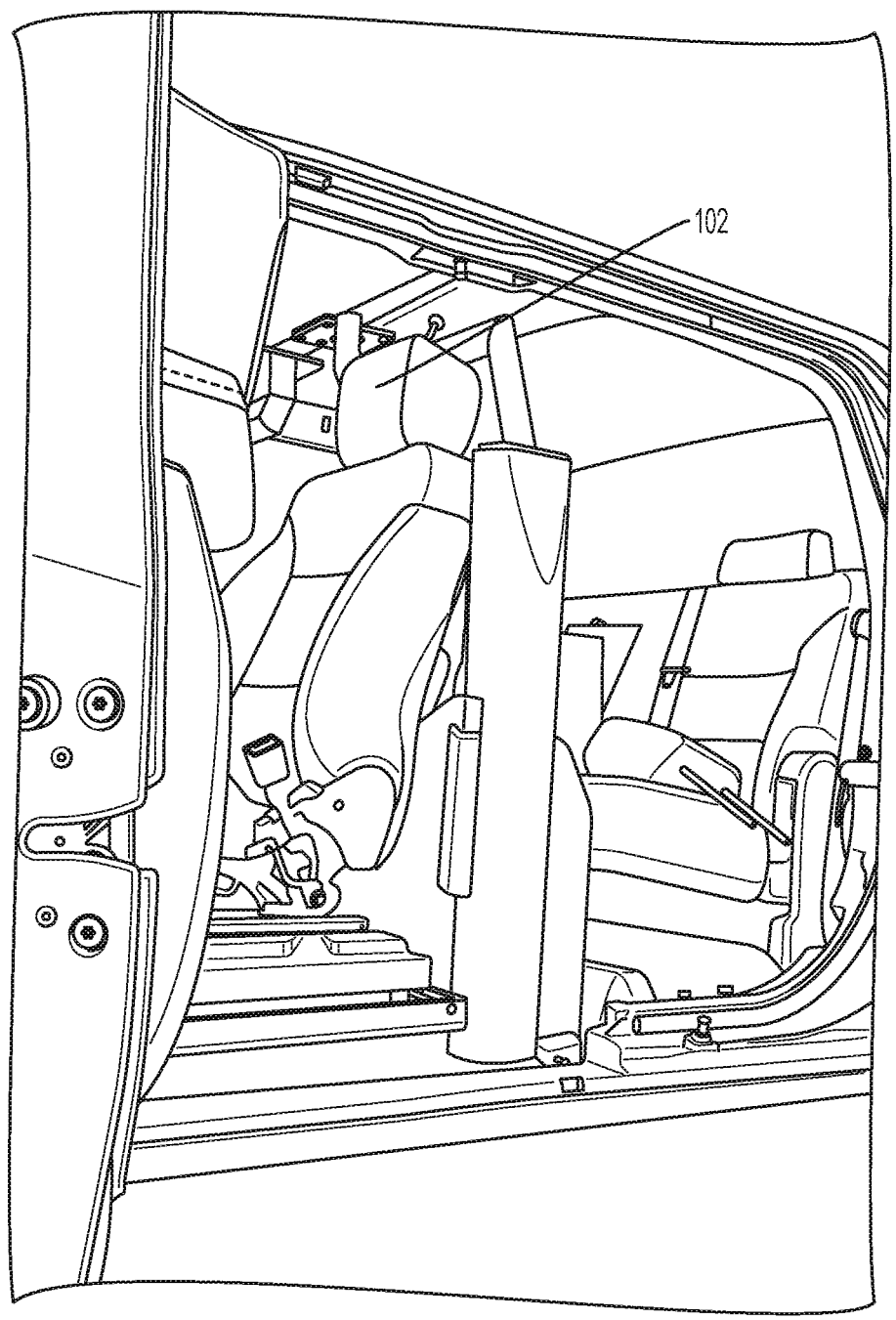
FIG. 11 shows a vehicle having the system for lifting wheelchair into and out of the vehicle in accordance with an embodiment of the present patent application, wherein the system has integral head rest(s)

In one embodiment, as shown in FIG. 11, the system 10 includes integral headrests 102 for both driver and passenger side wheelchair occupants. For example, in one embodiment, the integral headrest 102 may be configured to be attached to the seat/wheelchair being lifted into and out of the vehicle 12. In another embodiment, the integral headrest 102 may be configured to be attached/connected to the vertical support member 74 of the each extendable lift assembly 24a, 24b. In one embodiment, the integral headrest 102 has attachment portions that enable the integral headrest 102 to be removably connected to either the seat/wheelchair being lifted into and out of the vehicle 12 or the vertical support member 74 of the each extendable lift assembly 24a, 24b. This configuration of the integral headrest allows them to be easily switched to either seat/wheelchair attached configuration or system attached (attached to the vertical support member 74 of the each extendable lift assembly 24a, 24b) configuration, on the fly. This configuration of the integral headrest also allows them to be easily positioned on either driver or passenger side of the vehicle 12. FIGS. 19-24 show various exemplary embodiments of the system 10 with the integrated headrest 102.

The computer system of the system 10 may include one or more physical processors programmed with one or more computer program instructions, and/or other components. The computer system may be operatively connected to the drive mechanisms, actuators, sensors and/or other components disposed in the system 10 to receive signals/input therefrom, and to control these components by transmitting signals thereto. The computer system may be operatively connected to these components of the system 10 using either a wired or a wireless communication. The computer system may be operatively connected (e.g., using either a wired or a wireless communication) to a computer system of the vehicle to transmit signals thereto or receive signals therefrom.

The system 10 may include a visual display (e.g., touch screen or other display) operatively connected to the computer system. The occupant of the wheelchair may use the visual display to operate/control the system 10. Any warnings or alarms generated by the system 10 may also be displayed to the wheelchair occupant via the visual display.

The system 10 may include one or more sensors and an alarm indicator (e.g., visual display for visually alerting, speaker for audibly alerting, vibratory, etc.) operatively connected to the computer system. The one or more sensors are configured to sense the surroundings of the wheelchair support 26, 28 and send the signals to the computer system. The alarm indicator is configured for alerting the wheelchair occupant of any near obstacles during the movement of the wheelchair support 26, 28 based on the signals from the one or more sensors.

The system 10 may include an emergency stop button. When the emergency stop button is actuated by the occupant of the wheelchair, the system 10 is configured to prevent any operation or movement of the wheelchair support 26, 28. Each wheelchair support 26, 28 may include a respective emergency stop button.

The system 10 may be configured to prevent any operation or movement of the wheelchair support 26, 28 until the doors of the vehicle are opened. In one embodiment, the system 10 may include a door opening sensor operatively connected to the computer system to sense the vehicle door opening.

The system 10 may be configured to be controlled using a hand-held control, a remote control and/or other controls disposed on portions of the system 10.

The operation of the system 10 is described here. When the system 10 is actuated by the occupant of the wheelchair using a control, the system 10 may determine whether the vehicle is stationary (e.g., send a signal to and receive a signal from the vehicle 12 that the vehicle is in park or stopped). The system 10 may also determine whether the doors of the vehicle 12 are open (e.g., send a signal to and receive a signal from the door opening sensor).

When it is determined that the vehicle is stationary and the doors of the vehicle 12 are open, the system 10 may send signals to actuate the actuator 48. As described in detail above, when the actuator 48 is actuated, the wheelchair support 26, 28, attached to the one end of the piston of the linear actuator 48, translates horizontally along the first axis HT-HT. During this horizontal translation/movement of the wheelchair support 26, 28, the guide engagement members 54 engage with and slide along the guide members 50 to guide the wheelchair support 26, 28 along the first axis HT-HT. Also, during this horizontal translation/movement of the wheelchair support 26, 28, the guide engagement member 70 engages with and slides along the guide member 68 to guide the wheelchair support 26, 28 along the first axis HT-HT.

For example, FIG. 4 shows the wheelchair support 26, 28 in the generally horizontally extended position. That is, each extendable lift assembly 24a, 24b horizontally translates the respective wheelchair support 26, 28, along the first axis HT perpendicular to the vehicle longitudinal axis VL-VL, between their respective stowed position and their respective generally horizontally extended position. The proximity sensor 60 of system 10 may be used to determine whether the wheelchair support 26, 28 is in the generally horizontally extended position.

When the wheelchair support 26, 28 is in the generally horizontally extended position, the system 10 may send signals to the drive mechanism 101. As described in detail above, when the drive mechanism 101 is actuated, the wheelchair support 26, 28 is rotated about the second axis RM-RM perpendicular to the vehicle longitudinal axis VL-VL, between the generally horizontally extended position and the rotationally extended position. For example, FIG. 5 shows the wheelchair support 26, 28 in the rotationally extended position. The system 10 may include a sensor or other mechanism to sense whether the wheelchair support 26, 28 is in the rotationally extended position.

When the wheelchair support 26, 28 is in the rotationally extended position, the drive mechanism 101 continues to operate so that the respective wheelchair support 26, 28 is vertically translated, along the second axis RM-RM perpendicular to the vehicle longitudinal axis VL-VL, between the respective rotationally extended position and the respective deployed position.

When the wheelchair support 26, 28 is in the deployed position, the system 10 may send signals to unlock the wheelchair from the wheelchair support 26, 28. In one embodiment, the system 10 may be configured to receive an input from the occupant of the wheelchair to unlock the wheelchair from the wheelchair support 26, 28.

In one embodiment, by rotationally moving of the wheelchair support 26, 28 first and then vertically translating the wheelchair support 26, 28 to its deployed position, the system 10 minimizes the space needed adjacent the vehicle 12 for the occupant of the wheelchair to enter and exit the system 10.

The system 10 is also configured to perform these three operations (horizontal translation, rotational movement, and vertical translation) in a reverse order to position and lock the wheelchair support 26, 28 within the vehicle 12. That is, the system 10 is configured to 1) vertically translate the wheelchair support 26, 28, along the second axis RM-RM perpendicular to the vehicle longitudinal axis VL-VL, between the deployed position and the rotationally extended position; 2) rotationally move the wheelchair support 26, 28, about the second axis RM-RM perpendicular to the vehicle longitudinal axis VL-VL, between the rotationally extended position and the generally horizontally extended position; and 3) horizontally translate the wheelchair support 26, 28, along the first axis HT-HT perpendicular to the vehicle longitudinal axis VL-VL, between the generally horizontally extended position and the stowed position within the vehicle 12. The wheelchair is locked on to the wheelchair support 26, 28 prior to leaving the ground as part of the safety system to prevent the wheelchair (and occupant) from falling off the support 26, 28 while in motion.

Figure 14:
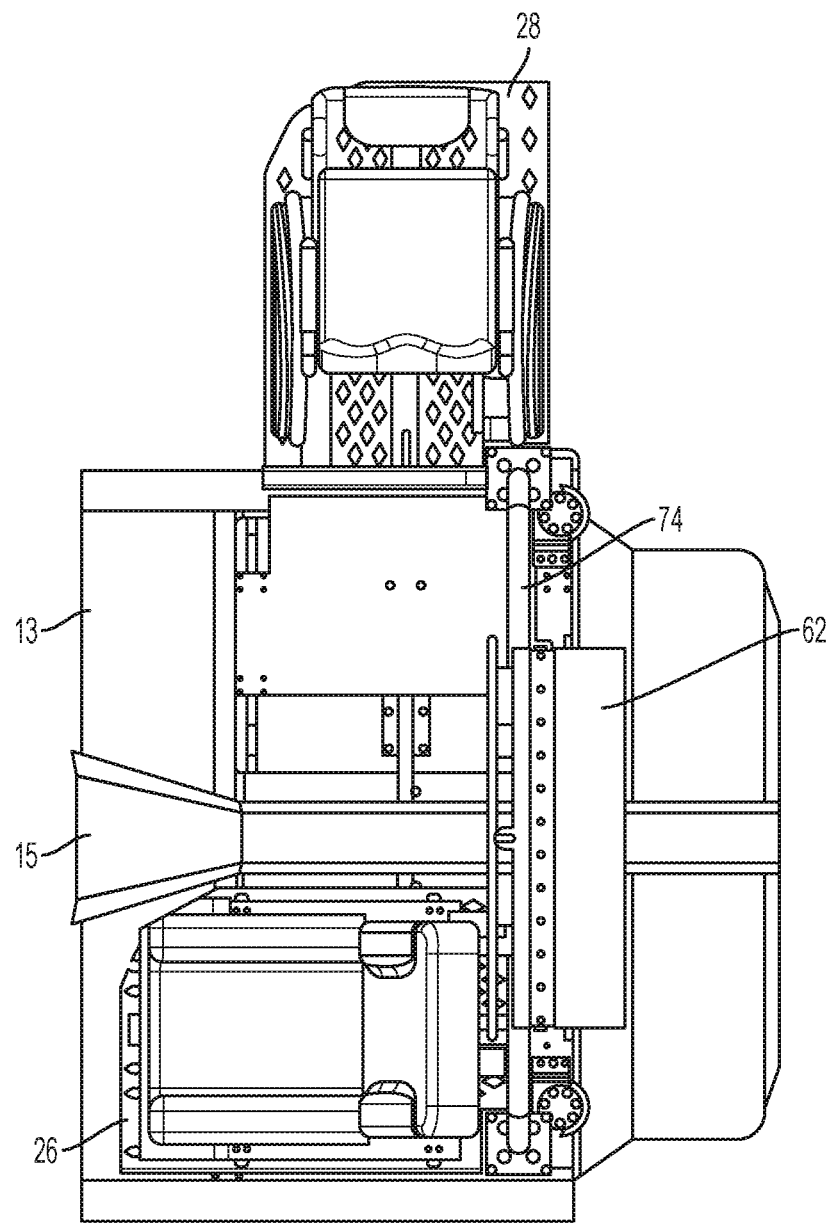
FIG. 14 shows a top plan view of an exemplary system for lifting the passenger side wheelchair and its respective wheelchair support into and out of the vehicle in accordance with an embodiment of the present patent application.
Figure 15:
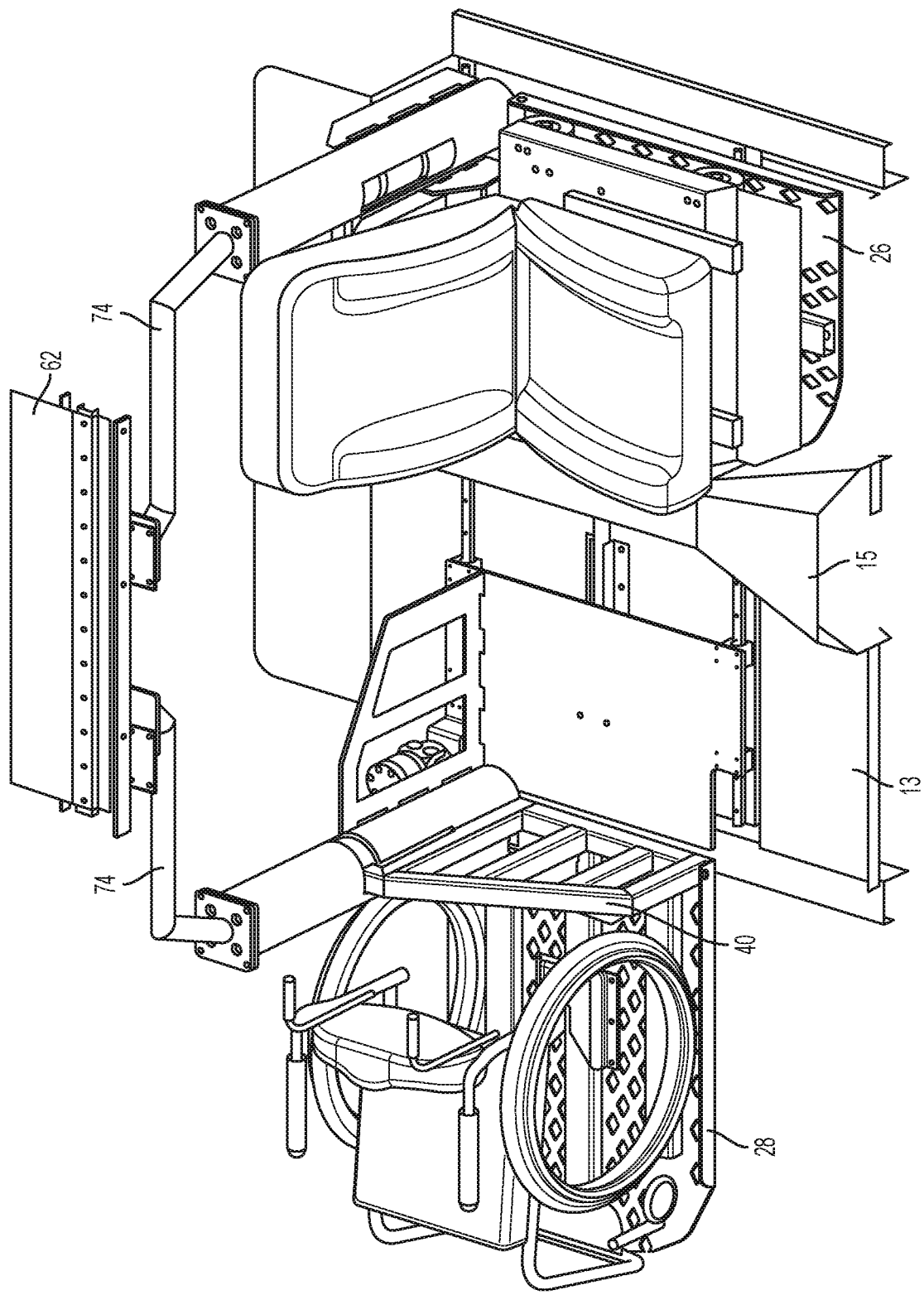
FIG. 15 shows a perspective view of the exemplary system of FIG. 14.
Figure 16:
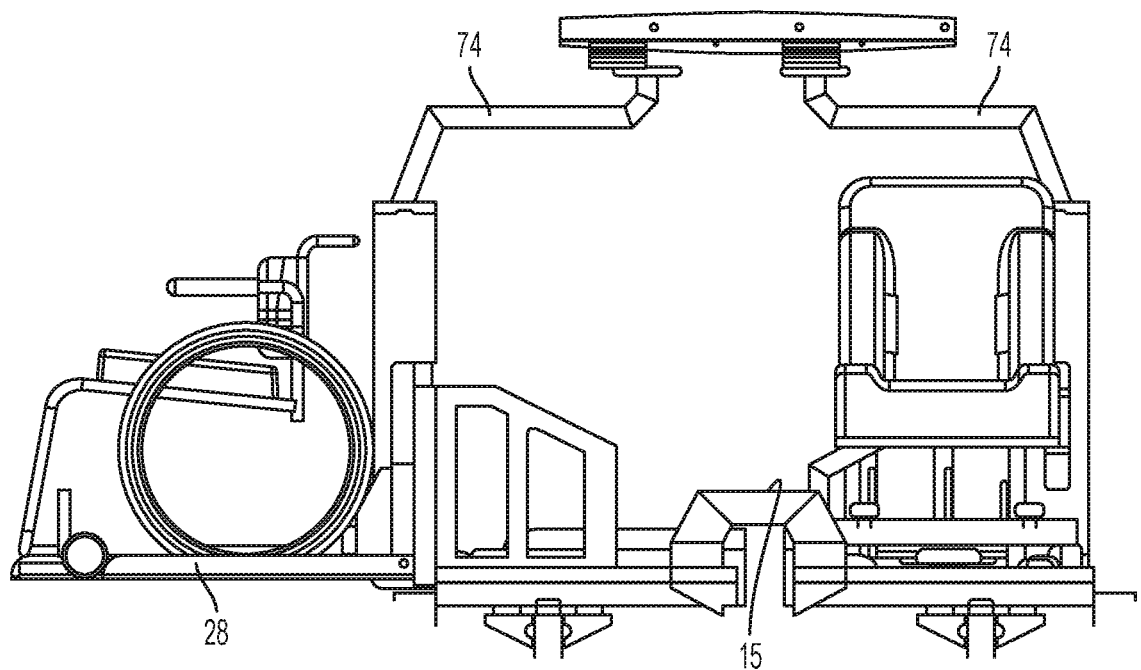
FIG. 16 shows a front elevational view of the exemplary system of FIG. 14.
Figure 17:
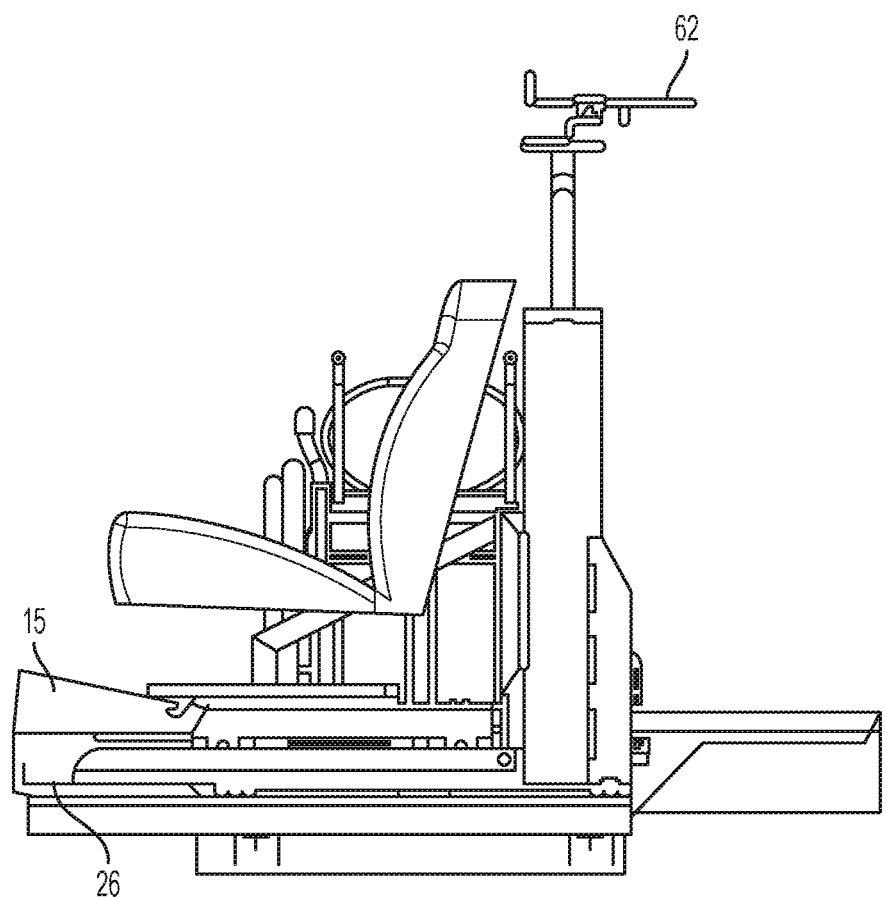
FIG. 17 shows a right side elevational view of the exemplary system of FIG. 14.
Figure 18:
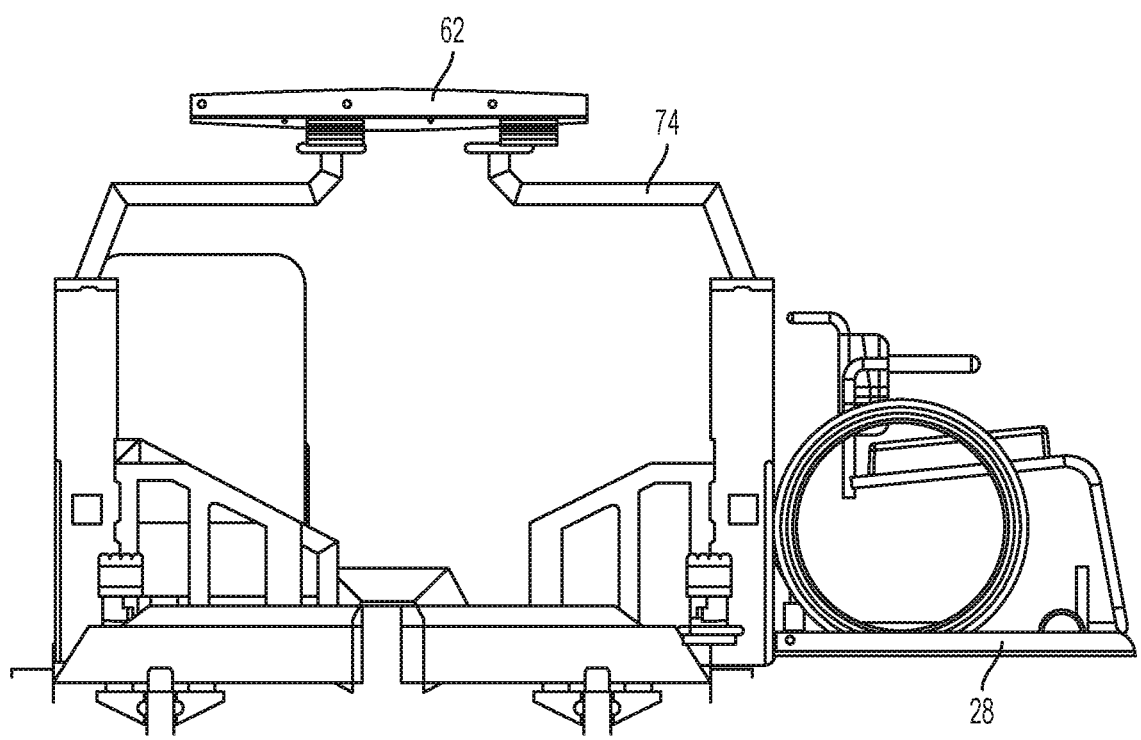
FIG. 18 shows a rear elevational view of the exemplary system of FIG. 14.

FIG. 14 shows a top plan view of an exemplary system for lifting the passenger side wheelchair and its respective wheelchair support into and out of the vehicle. FIGS. 15-18 show a perspective view, a front elevational view, a right side elevational view and a rear elevational view of the exemplary system of FIG. 14.

A method for installing the system 10 in the vehicle 12 is described here. The method includes modifying the floor pan and/or floor frame of the vehicle 12. For example, modifying the floor pan of the vehicle 12 may include replacing the existing vehicle floor pan with the modified vehicle floor pan 13. That is, cutting and removing the existing vehicle floor pan and installing the modified vehicle floor pan 13 to accommodate for the wheelchair supports 26, 28 and the extendable lift assemblies 24a, 24b of the system 10. Modifying the floor frame of the vehicle 12 may include partially cutting the floor frame to allow room for the wheelchair supports 26, 28 and the extendable lift assemblies 24a, 24b of the system 10, wherein the vehicle floor frame is cut before installing the modified vehicle floor.

The method also includes mounting 1) the roof support member 62 (with the guide member 68 disposed thereon) to the vehicle roof and 2) the lift base member 52 (with the guide members 50 disposed thereon) to the modified vehicle floor pan 13.

The method also includes installing the wheelchair support 26, 28 such that the guide engagement members 54 are slidably engaged with the guide members 50 disposed on the lift base member 52 and the guide engagement member 70 disposed on the vertical support member 74 is slidably engaged with the guide member 68 disposed on the roof support member 62.

The system of the present patent application, thus, provides an on-demand dual wheelchair access, the access is provided from either the passenger side or the driver side. The access is also provided either one at a time (i.e., the passenger side or the driver side) or simultaneously and on the fly. For example, the configuration of the on-demand dual wheelchair access may be useful where there may be more than one wheelchair user in the vehicle at a time (e.g., spouses/partners of the aging population; carpool) and/or incapacitation of the wheelchair driver needing to unexpectedly be a passenger until relief can be had.

The portions and dimensions of various parts or components of the exemplary system as shown and described here are intended to be merely exemplary and not limiting in any way. The various parts of the exemplary system are drawn to scale in accordance with one embodiment, although other scales and shapes may be used in other embodiments. The dimensions of various parts of the exemplary system are measured in millimeters, centimeters, or inches unless indicated otherwise. In one embodiment, the dimensions of various parts of the exemplary system, as shown and described here, are up to 5 percent greater than or up to 5 percent less than those illustrated and described. In another embodiment, the dimensions of various parts of the exemplary system, as shown and described here, are up to 10 percent greater than or up to 10 percent less than those illustrated and described. In yet another embodiment, the dimensions of various parts of the exemplary system, as shown and described here, are up to 15 percent greater than or up to 15 percent less than those illustrated and described. In yet another embodiment, the dimensions of various parts of the exemplary system, as shown and described here, are up to 20 percent greater than or up to 20 percent less than those illustrated and described.

While the present patent application has been described in connection with what is presently considered to be the most practical and preferred embodiment, it is to be understood that it is capable of further modifications and is not to be limited to the disclosed embodiment, and this application is intended to cover any variations, uses, equivalent arrangements or adaptations of the present patent application following, in general, the principles of the present patent application and including such departures from the present patent application as come within known or customary practice in the art to which the present patent application pertains, and as may be applied to the essential features hereinbefore set forth and followed in the spirit and scope of the appended claims.

What is claimed is:

1. A system for lifting a wheelchair into and out of a vehicle, the vehicle having a vehicle body, a passenger side front seat region, a driver side front seat region, a movably connected passenger side door closing the passenger side front seat region, and a movably connected driver side door closing the driver side front seat region, the system comprising:
    a driver side wheelchair support disposed in the driver side front seat region of the vehicle;
    a driver side extendable lift assembly arranged to move the driver side wheelchair support between a stowed position within the vehicle and a deployed position extended horizontally outside the vehicle and lowered towards the ground;
    a passenger side wheelchair support disposed in the passenger side front seat region of the vehicle;
    a passenger side extendable lift assembly arranged to move the passenger side wheelchair support between a stowed position within the vehicle and a deployed position extended horizontally outside the vehicle and lowered towards the ground;
    wherein each of the driver side extendable lift assembly and the passenger side extendable lift assembly is configured to rotationally move the respective wheelchair support, about an axis substantially perpendicular to a generally horizontal plane of ground, such that in their respective deployed position the respective wheelchair support faces laterally away from the vehicle; and
    a control system comprising a power source and a controller;
    wherein the control system is configured to independently operate the driver side extendable lift assembly and the passenger side extendable lift assembly to separately or simultaneously move the driver side wheelchair support and the passenger side wheelchair support between their respective stowed positions and their respective deployed positions.

2. The system of claim 1, further comprising a roof support member configured to be connected to a roof of the vehicle, and wherein the roof support member includes a guide member disposed thereon.

3. The system of claim 2, wherein the driver side extendable lift assembly includes an integrated headrest and the passenger side extendable lift assembly includes an integrated headrest.

4. The system of claim 2, wherein the driver side extendable lift assembly is operatively connected to the driver side wheelchair support, and the passenger side extendable lift assembly operatively connected to the passenger side wheelchair support.

5. The system of claim 4, wherein each of the driver side extendable lift assembly and the passenger side extendable lift assembly includes a first actuator configured to horizontally move the respective wheelchair support, along a first axis perpendicular to a vehicle longitudinal axis, between its stowed position and a generally horizontally extended position.

6. The system of claim 5, wherein each of the driver side extendable lift assembly and the passenger side extendable lift assembly includes a guide engagement member configured to be slidably engaged with the guide member of the roof support member to guide the respective wheelchair support along the first axis during the horizontal movement of the respective wheelchair support.

7. The system of claim 5, further comprising a lift base member configured to be connected to a floor of the vehicle, and wherein the lift base member includes a pair of guide members disposed thereon.

8. The system of claim 7, wherein one of the pair of guide members is configured to be slidably engaged with a guide engagement member disposed on the respective wheelchair support to guide the respective wheelchair support along the first axis during the horizontal movement of the respective wheelchair support.

9. The system of claim 5, wherein the axis is a second axis, each of the driver side extendable lift assembly and the passenger side extendable lift assembly includes a second actuator configured to rotationally move the respective wheelchair support, about the second axis perpendicular to the vehicle longitudinal axis, between its generally horizontally extended position and a rotationally extended position.

10. The system of claim 9, wherein each of the driver side extendable lift assembly and the passenger side extendable lift assembly includes a third actuator configured to vertically translate the respective wheelchair support, along the second axis perpendicular to the vehicle longitudinal axis, between its rotationally extended position and its deployed position.

11. The system of claim 10, wherein each of the driver side extendable lift assembly and the passenger side extendable lift assembly includes a telescopic arrangement having an inner member disposed in an outer member, wherein the telescopic arrangement of the inner and outer members is configured to facilitate the vertical translation of the respective wheelchair support between its rotationally extended position and its deployed position.

12. The system of claim 9, wherein the second actuator is also configured to vertically translate the respective wheelchair support, along the second axis perpendicular to the vehicle longitudinal axis, between its rotationally extended position and its deployed position.

13. A module for lifting a wheelchair into and out of a vehicle, the vehicle having a vehicle body, a seat region, a movably connected door closing the seat region, and a vehicle longitudinal axis, the module comprising:
an extendable lift assembly configured to be connected to the vehicle structure;
a roof support member configured to be connected to a roof of the vehicle, the roof support member having a guide member disposed thereon;
a lift base member configured to be connected to a floor of the vehicle, the lift base member having a guide member disposed thereon; and
a wheelchair support disposed in the seat region of the vehicle, the wheelchair support configured to be operatively connected to the extendable lift assembly and movable between a stowed position within the vehicle and a deployed position horizontally extended outside the vehicle and lowered towards the ground,
wherein the extendable lift assembly includes a guide engagement member configured to be slidably engaged with the guide member of the roof support member to guide the wheelchair support during a horizontal movement of the wheelchair support, along a first axis perpendicular to a vehicle longitudinal axis, between the stowed position and a generally horizontally extended position, and
wherein the extendable lift assembly is configured to rotationally move the wheelchair support about a second axis substantially perpendicular to a plane formed by the vehicle longitudinal axis and the first axis such that in the deployed position the wheelchair support faces laterally away from the vehicle.

14. The module of claim 13, wherein the extendable lift assembly is configured to rotationally move the wheelchair support about the second axis from the generally horizontally extended position to a rotationally extended position prior to lowering to the deployed position,
wherein, in the stowed position and in the generally horizontally extended position, the wheelchair support faces a forward direction of the vehicle along the vehicle longitudinal direction, and
wherein, in the rotationally extended position, the wheelchair support faces laterally away from the vehicle along the first axis.

15. A system for lifting a wheelchair into and out of a vehicle, the vehicle having a vehicle body, a seat region, a movably connected door closing the seat region, and a vehicle longitudinal axis, the system comprising:
an extendable lift assembly configured to be connected to the vehicle structure; and
a wheelchair support disposed in the seat region of the vehicle, the wheelchair support configured to be operatively connected to the extendable lift assembly and movable between a stowed position within the vehicle and a deployed position horizontally extended outside the vehicle and lowered towards the ground,
wherein the extendable lift assembly is configured to:
horizontally translate the wheelchair support, along a first axis perpendicular to the vehicle longitudinal axis, between the stowed position and a generally horizontally extended position;
rotationally move the wheelchair support, about a second axis perpendicular to both the vehicle longitudinal axis and the first axis, between the generally horizontally extended position and a rotationally extended position; and
vertically translate the wheelchair support, along the second axis perpendicular to the vehicle longitudinal axis, between the rotationally extended position and the deployed position,
wherein, in the rotationally extended position and the deployed position, the wheelchair support faces laterally away from the vehicle.

16. The system of claim 15, wherein, in the stowed position and in the generally horizontally extended position, the wheelchair support faces a forward direction of the vehicle along the vehicle longitudinal direction, and
wherein, in the rotationally extended position, the wheelchair support faces laterally away from the vehicle along the first axis.

17. A method of using a module for lifting a wheelchair into and out of a vehicle as recited in claim 13, the method comprising:
horizontally translating the wheelchair support, along the first axis perpendicular to the vehicle longitudinal axis, between the stowed position and the generally horizontally extended position; and
rotationally moving the wheelchair support, about the second axis perpendicular to both the vehicle longitudinal axis and the first axis, and vertically lowering the wheelchair support such that in the deployed position the wheelchair support faces laterally away from the vehicle.

18. The method according to claim 17, wherein the wheelchair support is rotationally moved from the generally horizontally extended position to a rotationally extended position facing laterally away from the vehicle and then is vertically lowered from the rotationally extended position to the deployed position.

* * * * *